United States Patent
Vitry et al.

(10) Patent No.: US 7,204,528 B2
(45) Date of Patent: Apr. 17, 2007

(54) LOAD-FLOOR LATCH

(75) Inventors: Fabrice Vitry, Worcester (GB); Colin Latham, Bilton Rugby (GB)

(73) Assignee: Southco, Inc., Concordville, PA (US)

( * ) Notice: Subject to any disclaimer, the term of this patent is extended or adjusted under 35 U.S.C. 154(b) by 0 days.

(21) Appl. No.: 11/170,259

(22) Filed: Jun. 29, 2005

(65) Prior Publication Data

US 2006/0001276 A1  Jan. 5, 2006

Related U.S. Application Data

(60) Provisional application No. 60/584,885, filed on Jun. 30, 2004.

(51) Int. Cl.
*E05C 1/12*   (2006.01)

(52) U.S. Cl. .......................... 292/165; 292/78; 292/79; 292/4; 292/DIG. 31

(58) Field of Classification Search ................ 292/165, 292/70, 75, 77, 76, 78, 79, 336, DIG. 61, 292/221, 227, 229, 209, 303, 334, 4, 5, DIG. 31
See application file for complete search history.

(56) References Cited

U.S. PATENT DOCUMENTS

| | | | | |
|---|---|---|---|---|
| 1,711,213 A | * | 4/1929 | Smith | 292/198 |
| 3,713,681 A | * | 1/1973 | Worley | 292/78 |
| 3,743,336 A | * | 7/1973 | Andrews | 292/173 |
| 4,438,964 A | * | 3/1984 | Peters | 292/216 |
| 4,687,237 A | * | 8/1987 | Bisbing | 292/78 |
| 5,058,937 A | * | 10/1991 | Miehe et al. | 292/34 |
| 5,611,224 A | * | 3/1997 | Weinerman et al. | 70/208 |
| 6,109,667 A | * | 8/2000 | Collins | 292/78 |
| 6,155,616 A | * | 12/2000 | Akright | 292/207 |
| 6,203,077 B1 | * | 3/2001 | Schlack | 292/203 |
| 6,626,472 B1 | * | 9/2003 | Berg | 292/336.3 |
| 6,719,332 B2 | | 4/2004 | Sekulovic | |

OTHER PUBLICATIONS

International Patent Application No. PCT/US2005/023723, filed on Jun. 30, 2005, and naming Southco, Inc. as applicant.
International Patent Application No. PCT/US2005/023296, filed on Jun. 29, 2005, and naming Southco, Inc. as applicant.

* cited by examiner

*Primary Examiner*—Brian E. Glessner
*Assistant Examiner*—Mark Williams
(74) *Attorney, Agent, or Firm*—Paul & Paul

(57) ABSTRACT

A latching system including a latch assembly and a keeper is disclosed. The latch assembly includes a grabber catch attached to a cup-like housing. In the illustrated embodiment the latch assembly also includes a rectilinearly moving pawl that is actuated by a handle pivotally attached to the cup-like housing. The pawl of the grabber catch and the rectilinearly moving pawl both engage the keeper when the keeper is secured to the latch assembly.

5 Claims, 29 Drawing Sheets

LOAD-FLOOR LATCH

CROSSREFERRENCE TO RELATED APPLICATIONS

This application claims the benefit of the priority of U.S. Provisional Patent Application Ser. No. 60/584,885, filed on Jun. 30, 2004, the entire disclosure of which is incorporated herein by reference.

BACKGROUND OF THE INVENTION

1. Field of the Invention

The present invention relates to a latching device for releasably securing a closure member, such as a panel or door, in the closed position.

2. Description of the Prior Art

Trunks of automobiles are usually provided with removable load-floor panels. These panels ordinarily support the weight of objects placed in the trunks of cars and are removable to allow access to a spare tire, for example, which is commonly stored under the load-floor panel. It is common for the load-floor panel to be held in place by gravity and a floor mat that usually covers the load-floor panel. The load-floor panels are usually equipped with handles that are flush with the top surface of the load-floor panel in order to allow a user to remove the panel when necessary. However, this commonly used arrangement has a draw back in that the load-floor panel may become dislodged when traveling over rough roads. Further, because the panel is not positively secured in place, it may become loose and rattle around in the trunk resulting in undesirable noises. Therefore, latches have been proposed in the art to positively secure such load-floor panels in place.

Examples of such latches can be seen in U.S. Pat. No. 6,626,472 B1, issued to Gert Berg on Sep. 30, 2003, and U.S. Pat. No. 6,719,332 B2, issued to Ivica Sekulovic on Apr. 13, 2004, which are incorporated by reference herein in their entirety. However, for some applications a latch that requires a reduced closing force, as compared to the latches disclosed in the patents cited above, may be desirable. Accordingly, the need persists in the art for improved latches for positively securing load-floor panels in place.

SUMMARY OF THE INVENTION

The present invention is directed to a latching system for use with closure members such as panels, drawers, doors, etc. Although the operation of the latching system of the present invention will be described in the context of securing the load-floor panel of the trunk of an automobile, the latch of the present invention is widely applicable to many kinds of doors, windows, panels, and drawers. The latching system of the present invention releasably secures a first closure member, such as a door, window, panel, or drawer, to a second closure member, such as another door, window, panel, or drawer or a frame surrounding the first closure member. The latching system of the present invention includes a latch assembly and a keeper. In its simplest form the latch assembly is formed by a cup-like housing incorporating a grabber catch adapted for engagement with the keeper. The illustrated embodiment of the latch assembly includes a first housing, a handle, an actuator, a torsion spring, a first pawl and a grabber catch. The grabber catch in turn includes a second housing, a second pawl, and a biasing means that biases the second pawl toward a latched position when the second pawl is at or near its latched position and biases the second pawl toward an unlatched position when the second pawl is at or near its unlatched position. The second housing is attached to the first housing. In the illustrated embodiment the second housing is integral with the first housing. The first pawl travels rectilinearly between retracted and extended positions and the second pawl moves pivotally. The second pawl moves under an L-shaped projection of the keeper and the first pawl moves into a cavity in one side of the L-shaped projection, thus both the first and second pawl act to secure the latch assembly to the keeper. The first housing forms a cup-like depression which receives the handle when the handle is in the closed position. The cup-like depression of the first housing has an essentially enclosed bottom and an open top. A bezel or flange extends along at least a portion of the perimeter of the open top of the first housing. The first housing supports the torsion spring and the first pawl. The handle can be in the form of a paddle or a ring to facilitate grasping of the handle by a user.

The latch body formed by the first and second housings is installed in an aperture or cutout in the first closure member using any of several well-known fastening means. The first pawl projects through an opening in the sidewall of the first housing and into the second housing at least when the first pawl is in its extended position. The second housing houses the second pawl and the biasing means for biasing the second pawl toward a latched position when the second pawl is at least approximately at its latched position and biasing the second pawl toward an unlatched position when the second pawl is at least approximately at its unlatched position. The second pawl and the biasing means for biasing the second pawl form what is referred to as an over-center toggle mechanism in the art. Examples of similar over-center toggle mechanisms can be found in U.S. Pat. No. 4,687,237, issued to Robert H. Bisbing on Aug. 18, 1987, and U.S. Pat. No. 6,203,077 B1, issued to Richard E. Schlack on Mar. 20, 2001, which are incorporated by reference herein in their entirety.

The torsion spring biases the first pawl toward its extended position where the first pawl projects into the second housing. The handle is pivotally supported by the first housing and has an actuating arm that impinges upon an opening in the first pawl. The actuating arm of the handle constitutes the actuator in the illustrated embodiment. When the latch handle is lifted out of the cup-like depression of the first housing, the actuating arm of the handle retracts the first pawl to the unlatched position. Once the first pawl is in the unlatched position, the handle must be pulled with sufficient force to overcome the force exerted by the biasing means of the grabber catch on the second pawl in order to move the first closure member to the open position.

During closing of the first member, a beveled surface, provided on the underside of the first pawl, cooperates with the roughly L-shaped projection of the keeper to slide the pawl to the unlatched position as the first closure member is slammed shut. The torsion spring then moves the first pawl to the latched position once the first pawl is in alignment with the cavity or hole in the side of the L-shaped projection such that the pawl will extend into the cavity or hole in the side of the L-shaped projection in order to secure the first closure member in place.

At the beginning of the closing sequence just described, the second pawl is in the unlatched position and is held there by the biasing force of the biasing means of the grabber catch. In this position the biasing force of the biasing means of the grabber catch biases the second pawl toward the unlatched position. The second housing has an open bottom that faces in the direction opposite the direction in which the open top of the first housing faces. As the first closure member is moved to the closed position, the L-shaped projection begins to move into the second housing through the open bottom of the second housing. With the second pawl in the unlatched position, the L-shaped projection of the keeper clears the second pawl. As the L-shaped projection and the second housing relatively move such that more of the L-shaped projection projects into the second housing, a point is reached where a projecting arm of the second pawl contacts the base of the keeper and begins to pivotally move toward the latched position. During movement of the second pawl toward the latched position, the projecting arm of the second pawl moves under the portion of the L-shaped projection that overhangs the base of the keeper in cantilever fashion. Furthermore, during movement of the second pawl toward the latched position, the second pawl passes through a neutral position intermediate the unlatched position and the latched position. Once the second pawl is intermediate the neutral position and the latched position, the biasing tendency of the biasing means of the grabber catch changes such that the biasing means of the grabber catch now biases the second pawl toward the latched position. Thus, when the second pawl is intermediate the neutral position and the latched position the biasing force of the biasing means of the grabber catch, acting via the second pawl, tends to pull the L-shaped projection of the keeper into the second housing. In this way, the potential energy stored in the biasing means of the grabber catch when the second pawl is in the neutral position aids in the closing of the first closure member to thereby reduce the effort required for closing the first closure member.

With the second pawl in the latched position, the first closure member is secured in the closed position by the biasing force of the biasing means of the grabber catch. In addition, the first pawl simultaneously moves into the cavity in the side of the L-shaped projection of the keeper to positively secure the latch assembly to the keeper such that the first closure member cannot be opened with out operating the handle of the latch assembly.

To open the first closure member, the latch handle is lifted out of the cup-like depression of the first housing causing the actuating arm of the handle to retract the first pawl to the unlatched position. Once the first pawl is in the unlatched position, the handle must be pulled with sufficient force to overcome the force exerted by the biasing means of the grabber catch on the second pawl in order to move the first closure member to the open position. During this phase of the opening operation the second pawl is moved from the latched position toward the unlatched position by the pulling force exerted on the second pawl by the L-shaped projection of the keeper. During movement of the second pawl toward the unlatched position, the second pawl passes through the same neutral position intermediate the latched position and the unlatched position. Once the second pawl is intermediate the neutral position and the unlatched position, once again the biasing tendency of the biasing means of the grabber catch changes such that the biasing means of the grabber catch now biases the second pawl toward the unlatched position. Once the second pawl in the unlatched position, the L-shaped projection of the keeper clears the second pawl such that the L-shaped projection of the keeper can be removed from the second housing and the keeper can be released from the latch assembly.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
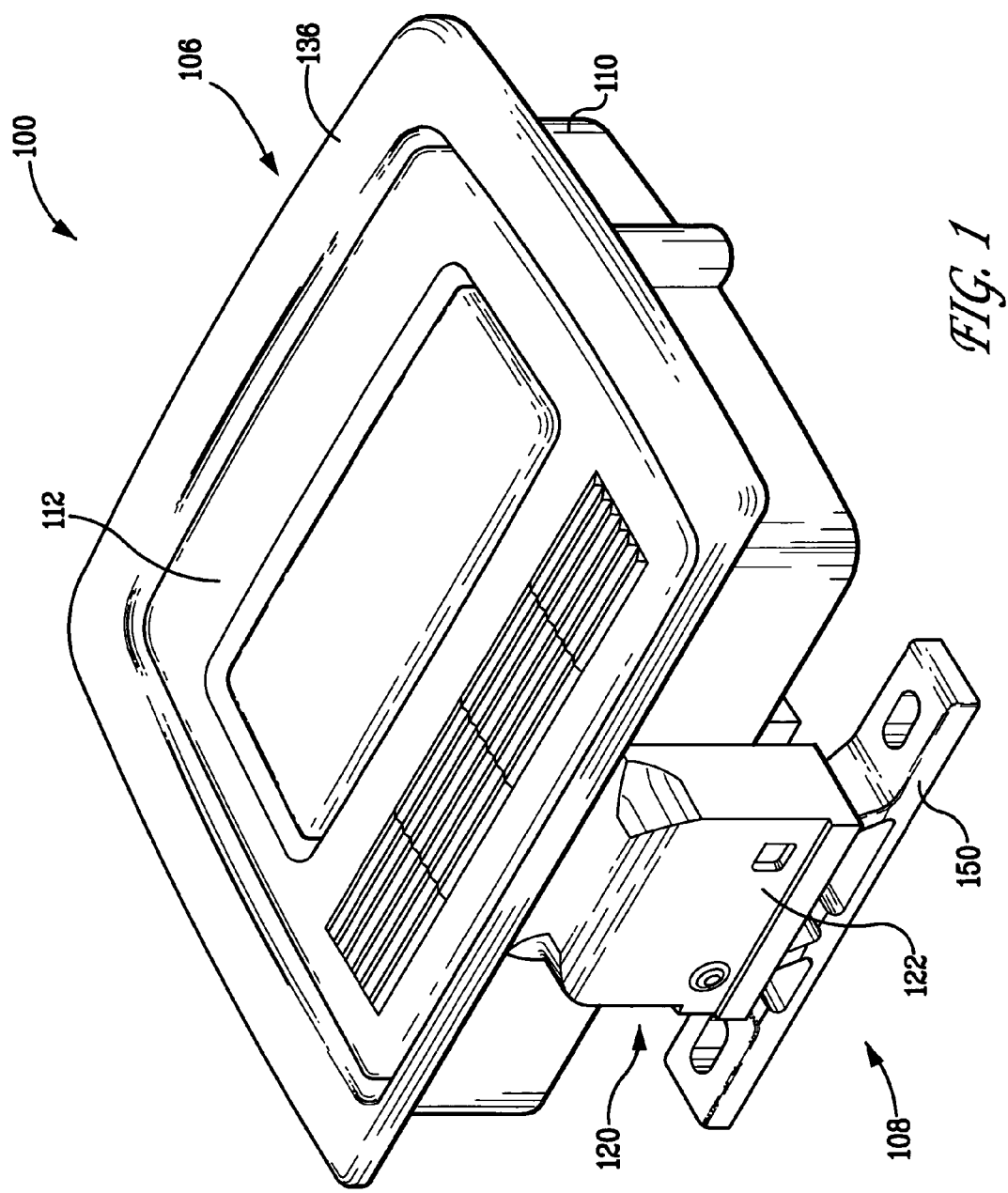
FIGS. 1–4 are views of the latching system of the present invention.
Figure 2:
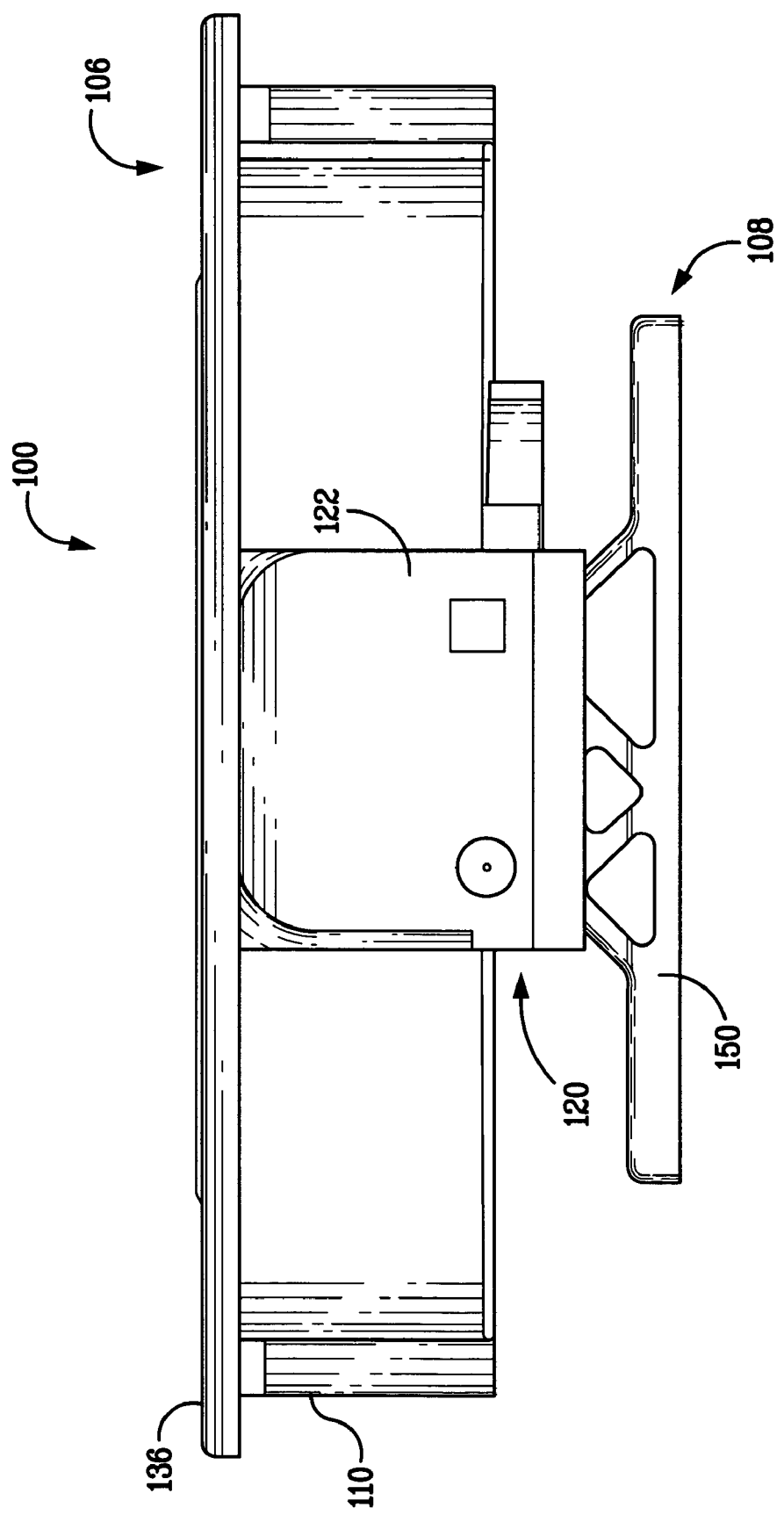
Figure 3:
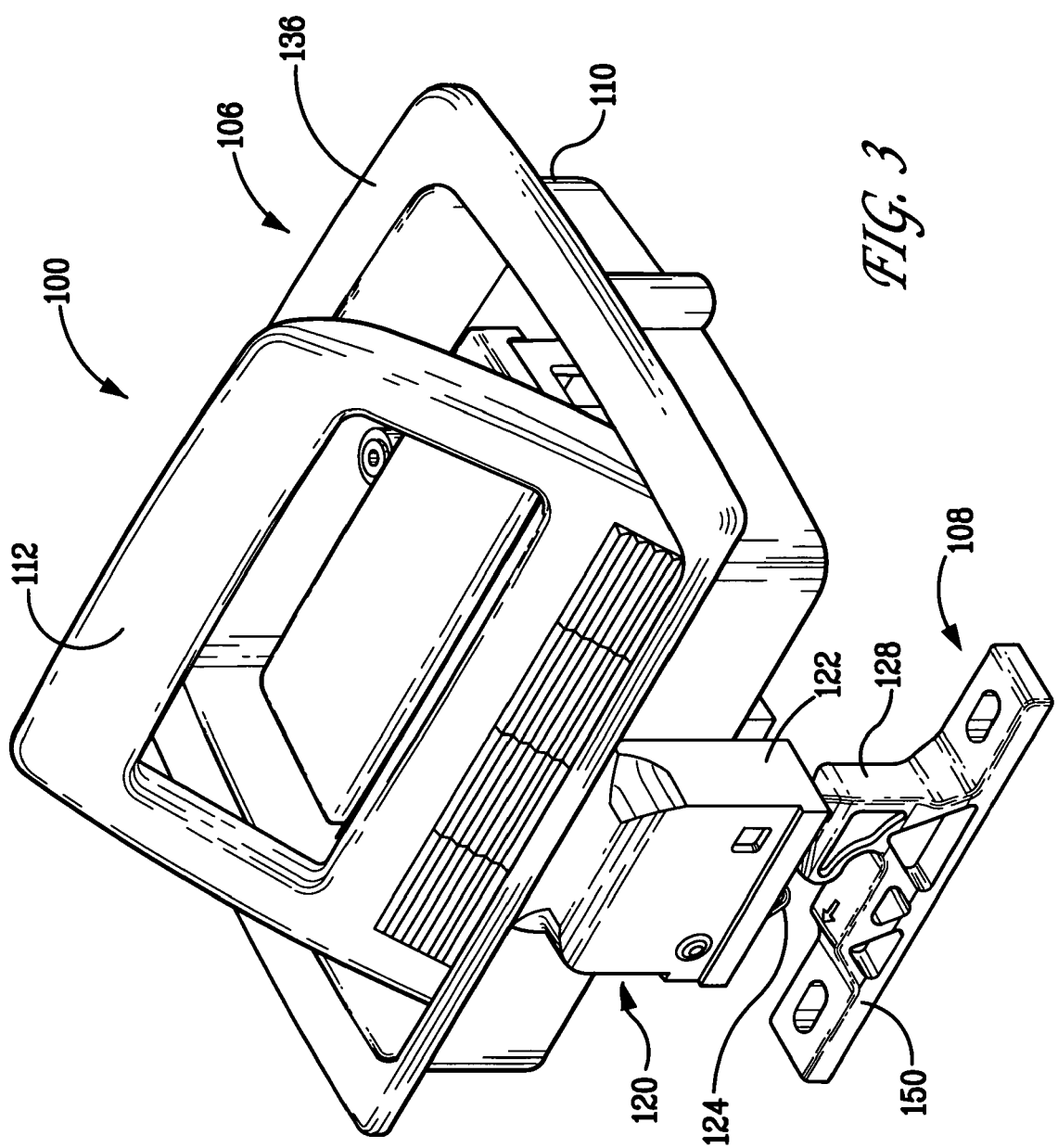
Figure 4:
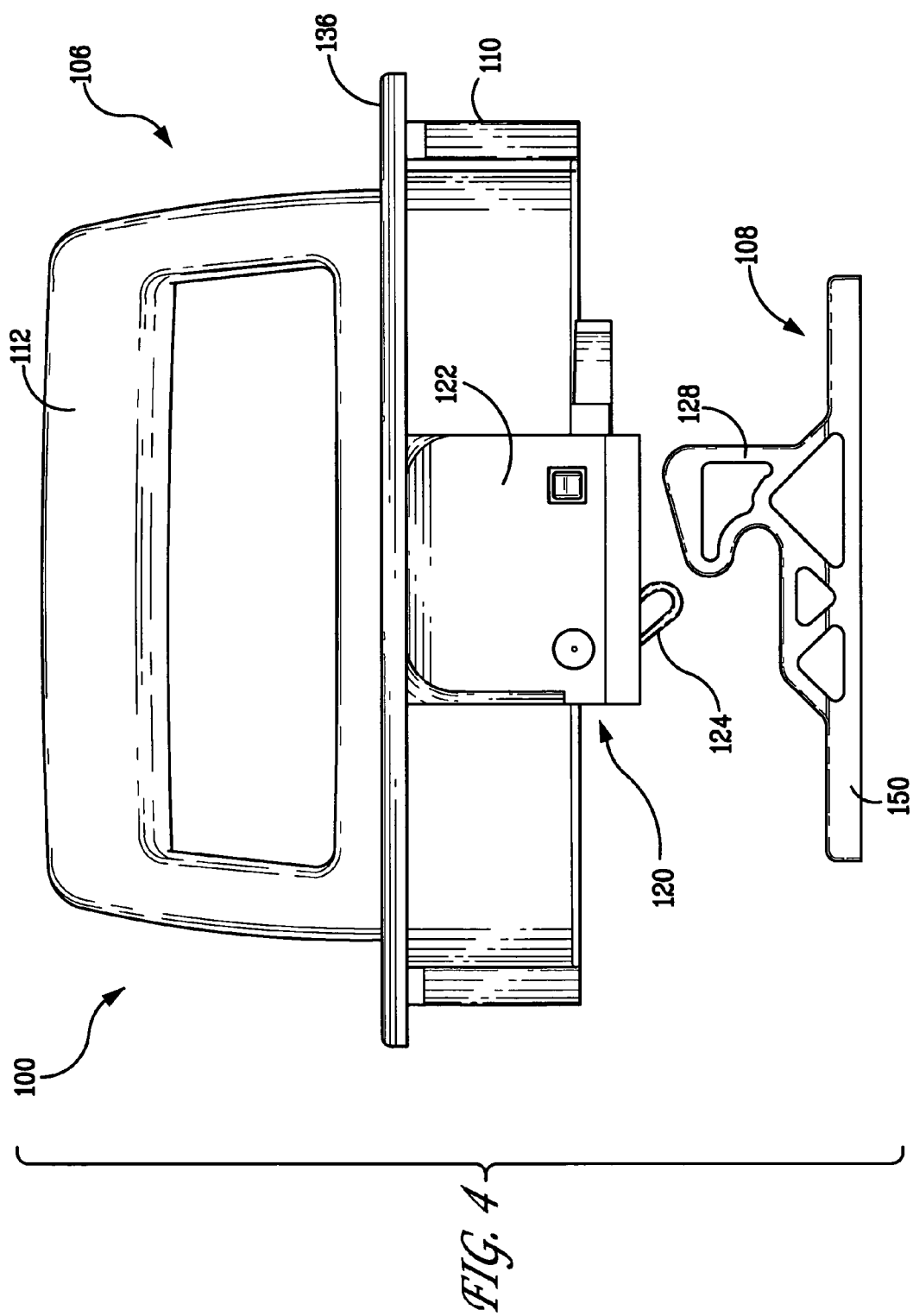
Figure 5:
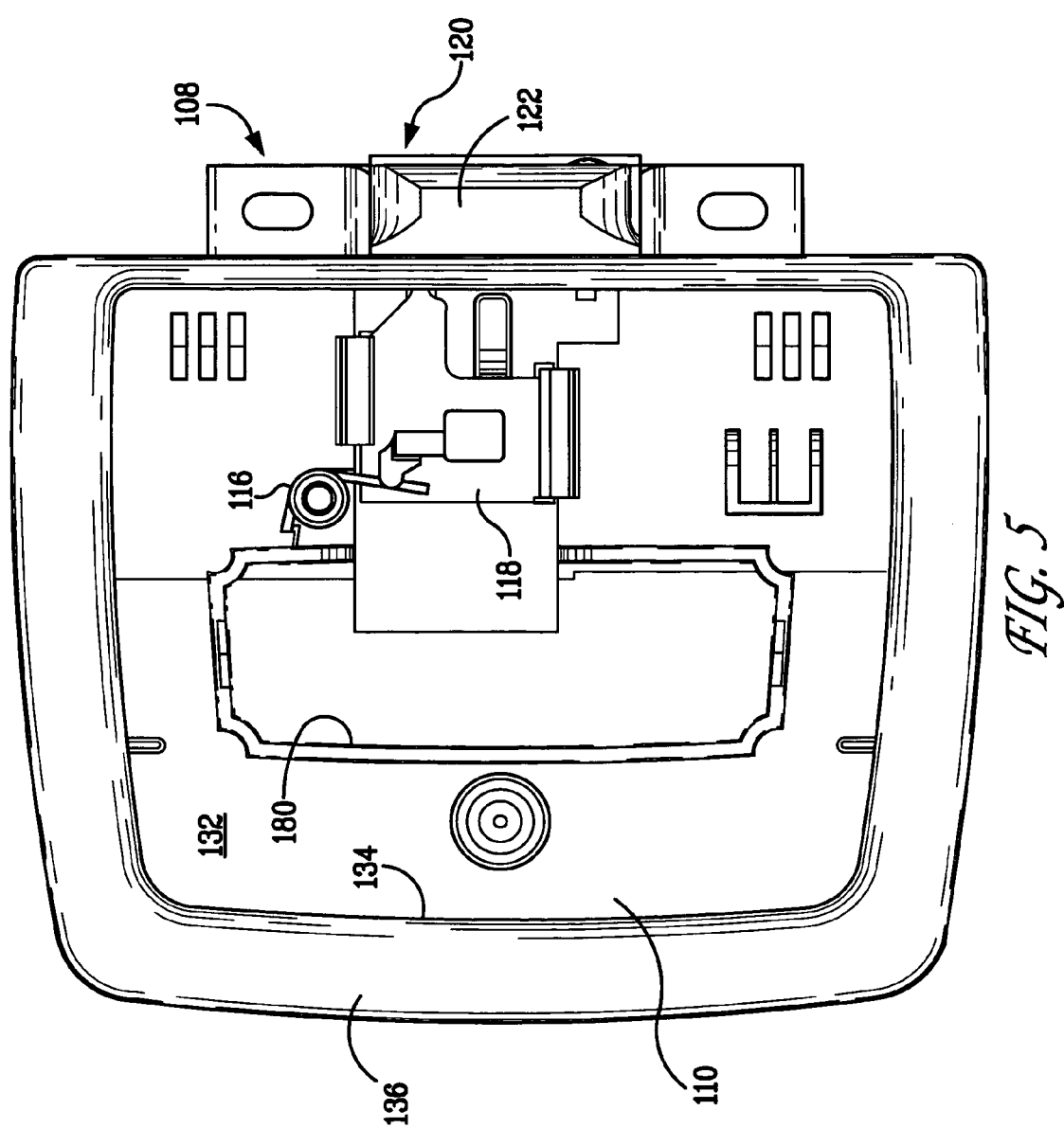
FIGS. 5–6 are views of the latching system of the present invention with the handle removed to show internal detail.
Figure 6:
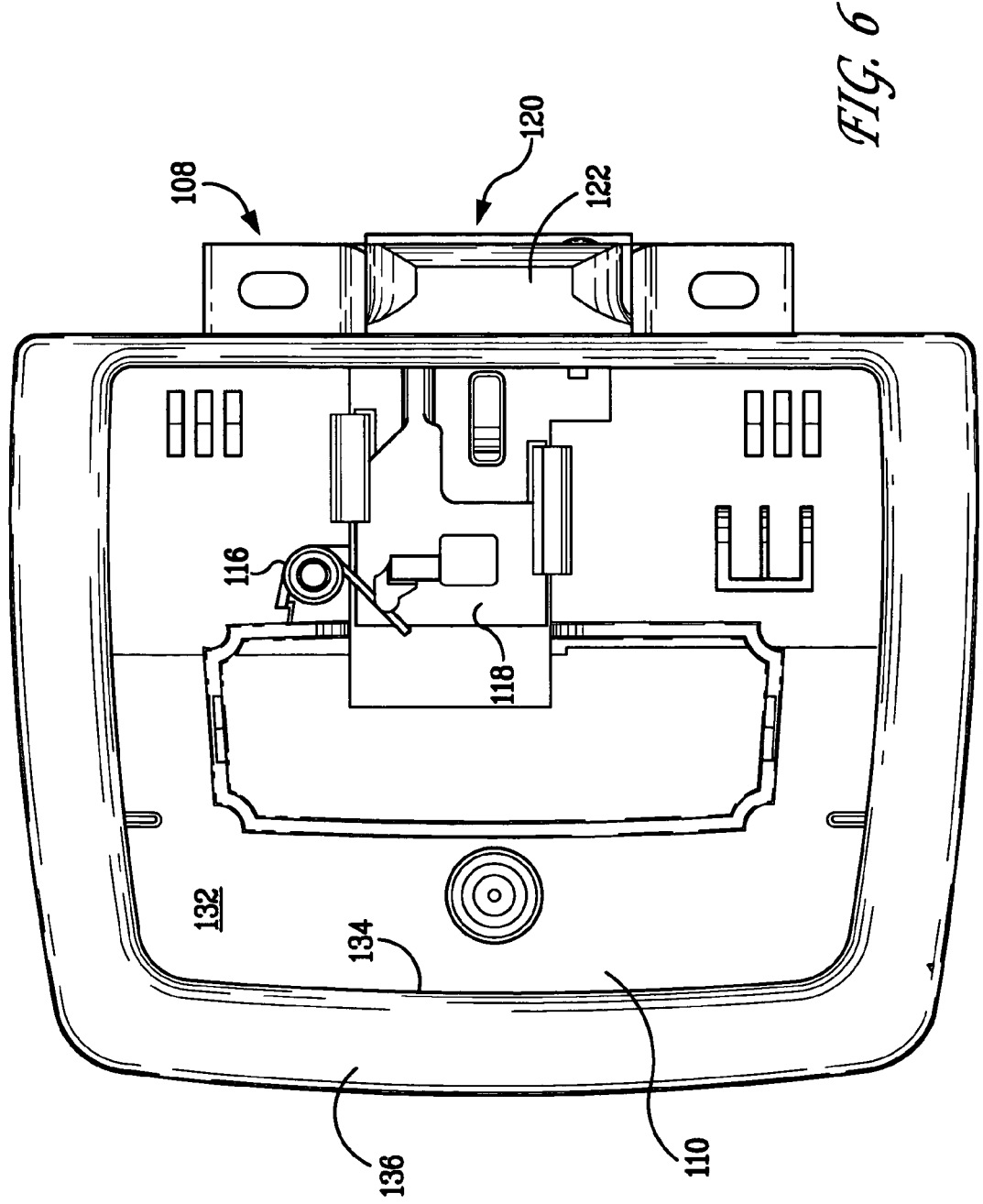
Figure 7:
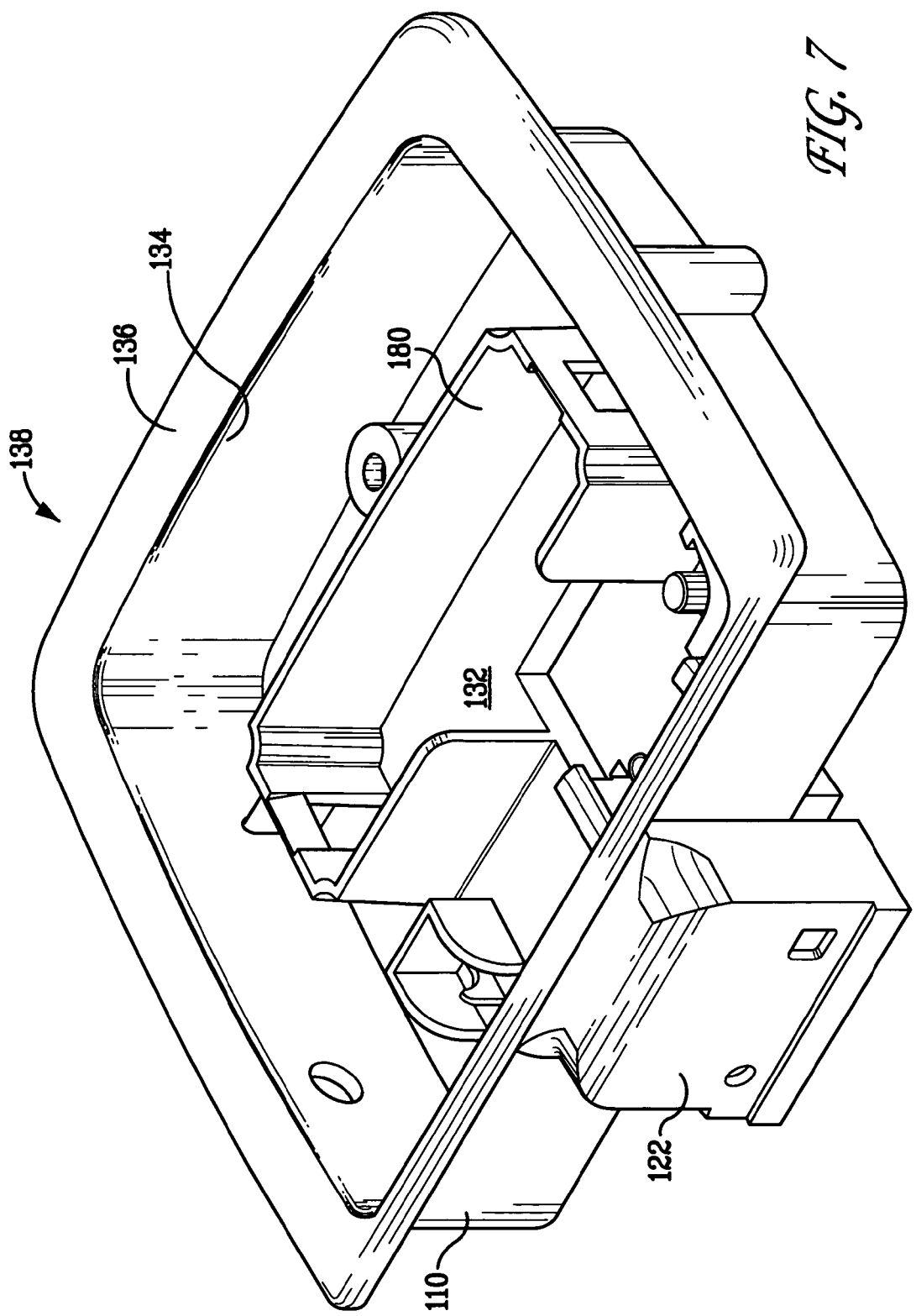
FIGS. 7–9 are views of the latch body of the present invention.
Figure 8:
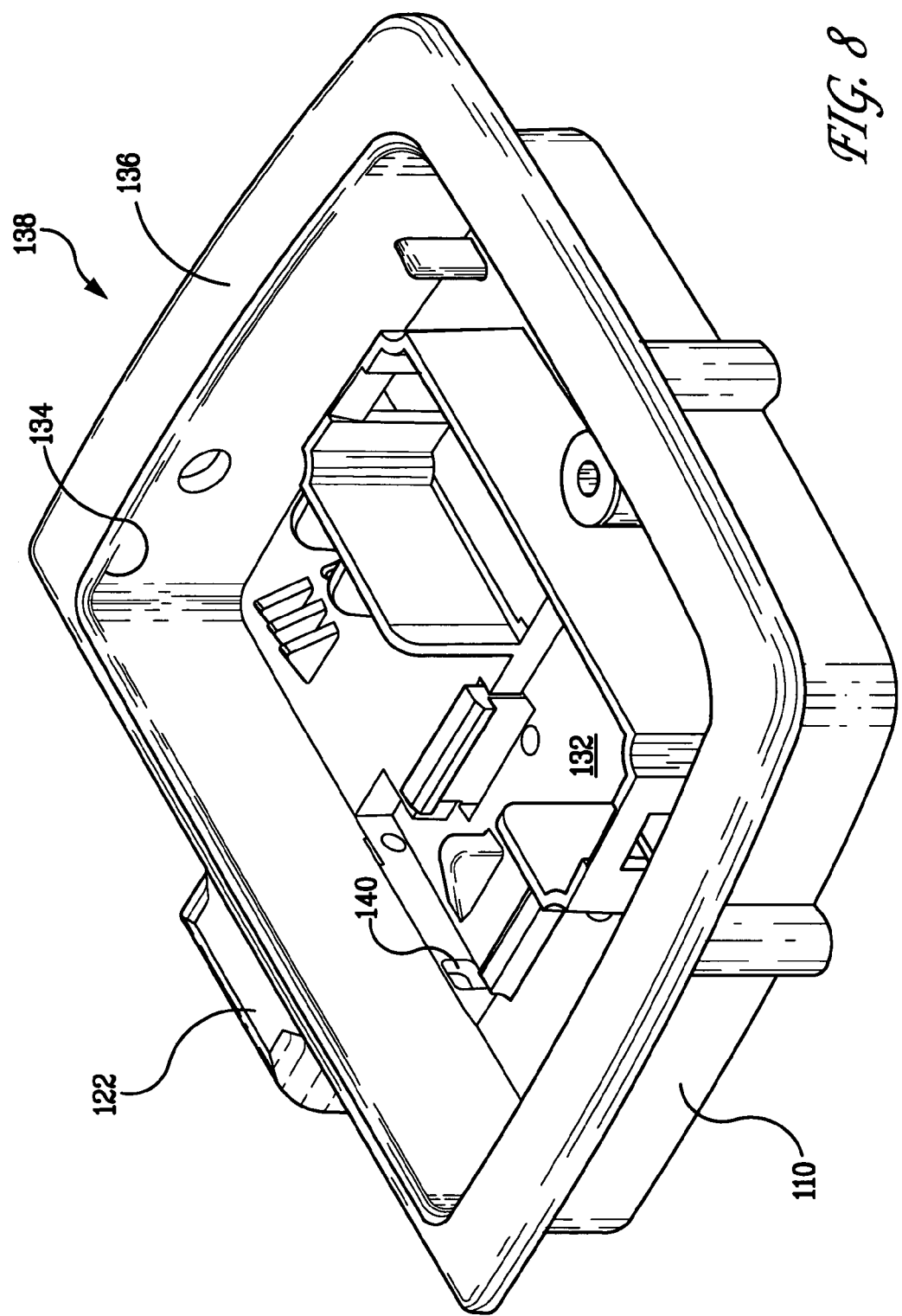
Figure 9:
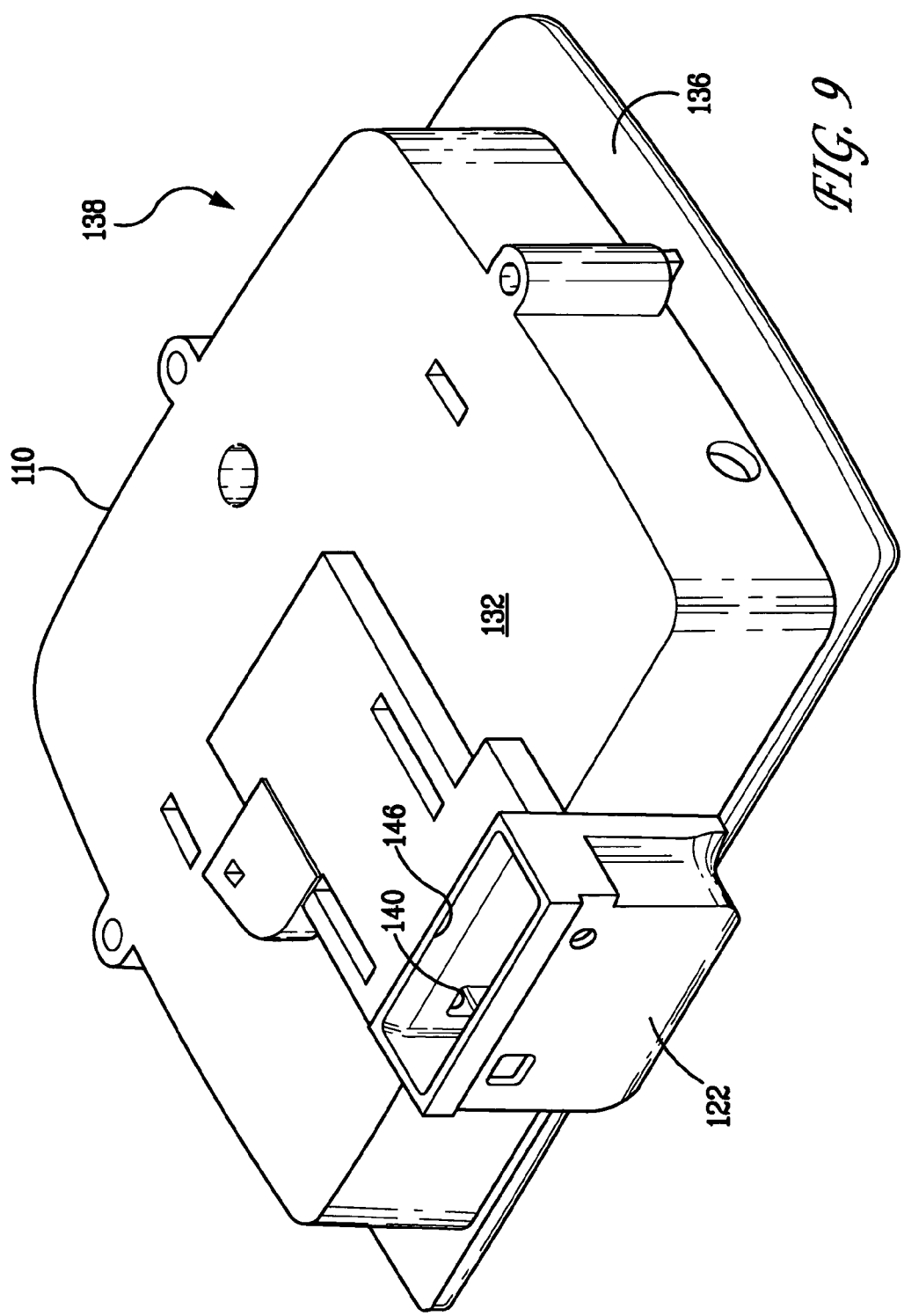
Figure 10:
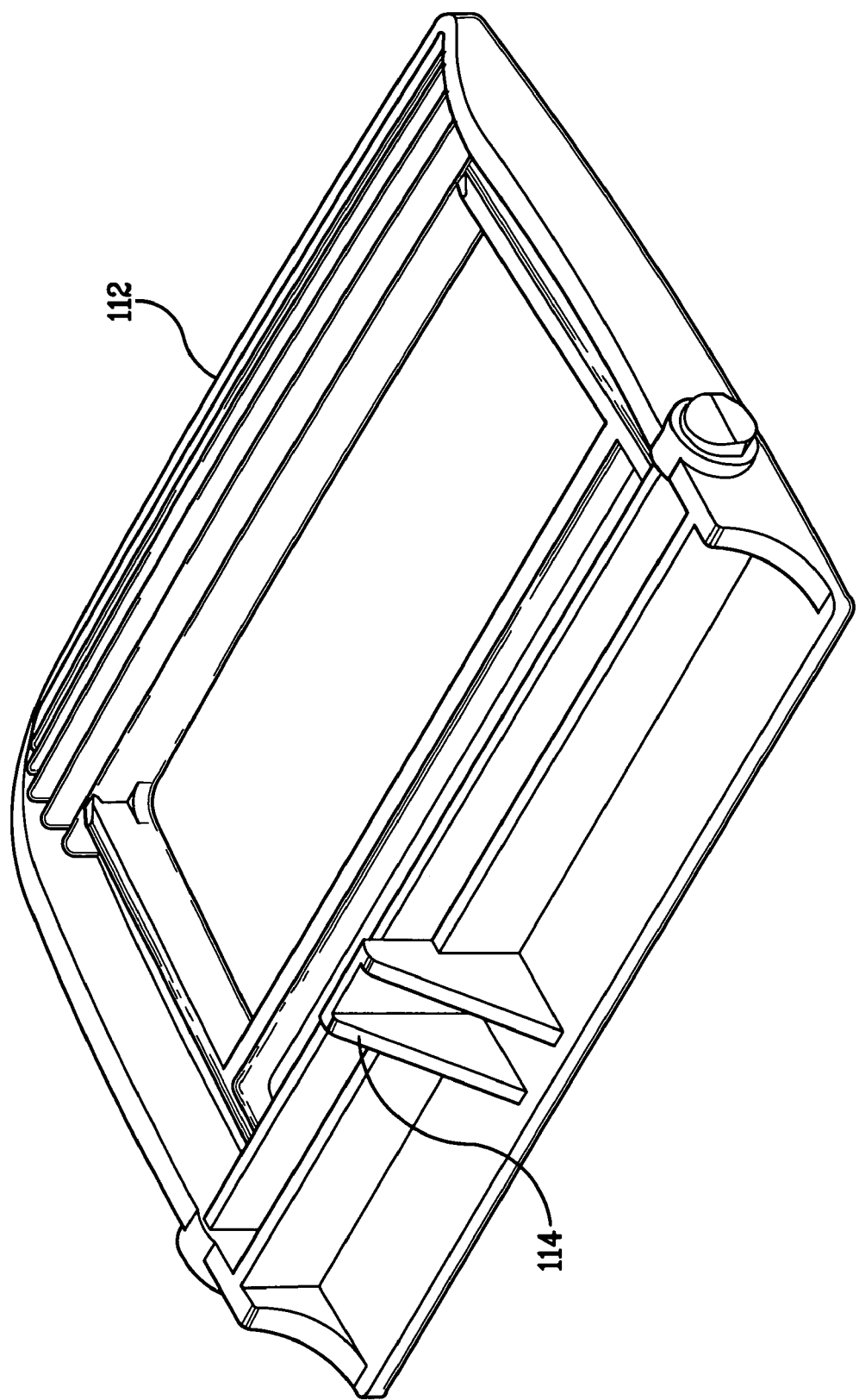
FIGS. 10–11 are views of the latch handle of the present invention.
Figure 11:
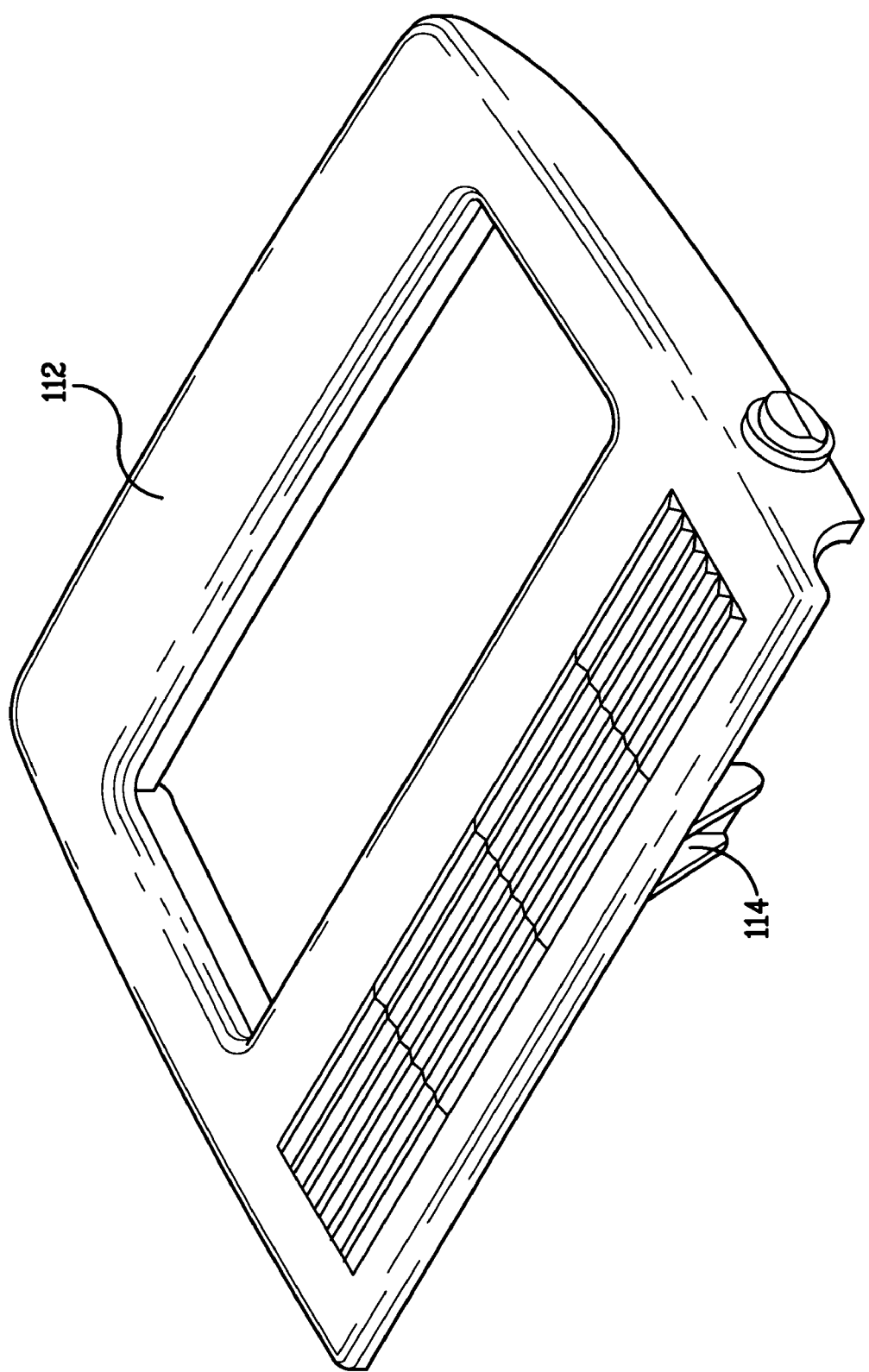
Figure 12:
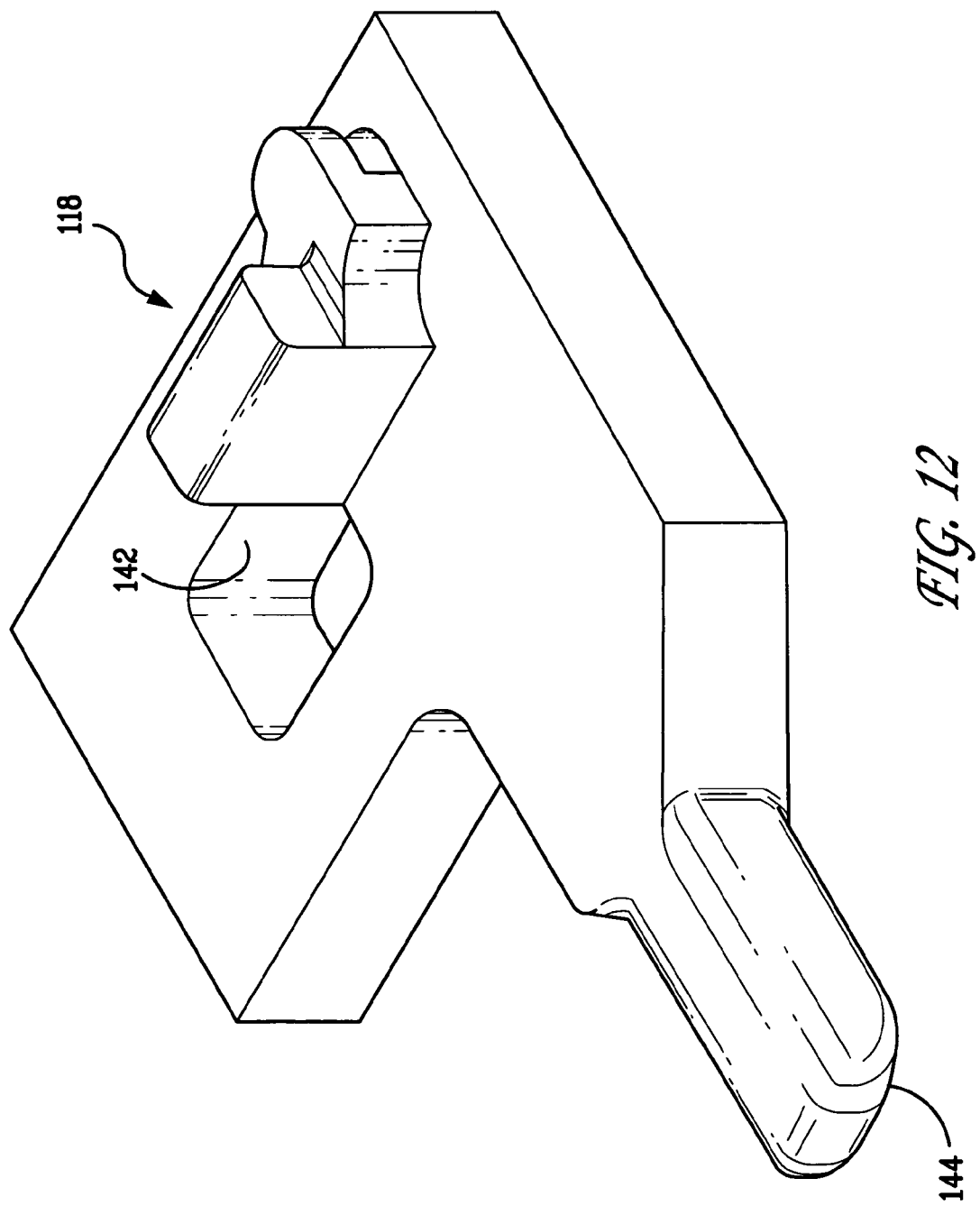
FIGS. 12–15 are views of the rectilinearly moving pawl of the present invention.
Figure 13:
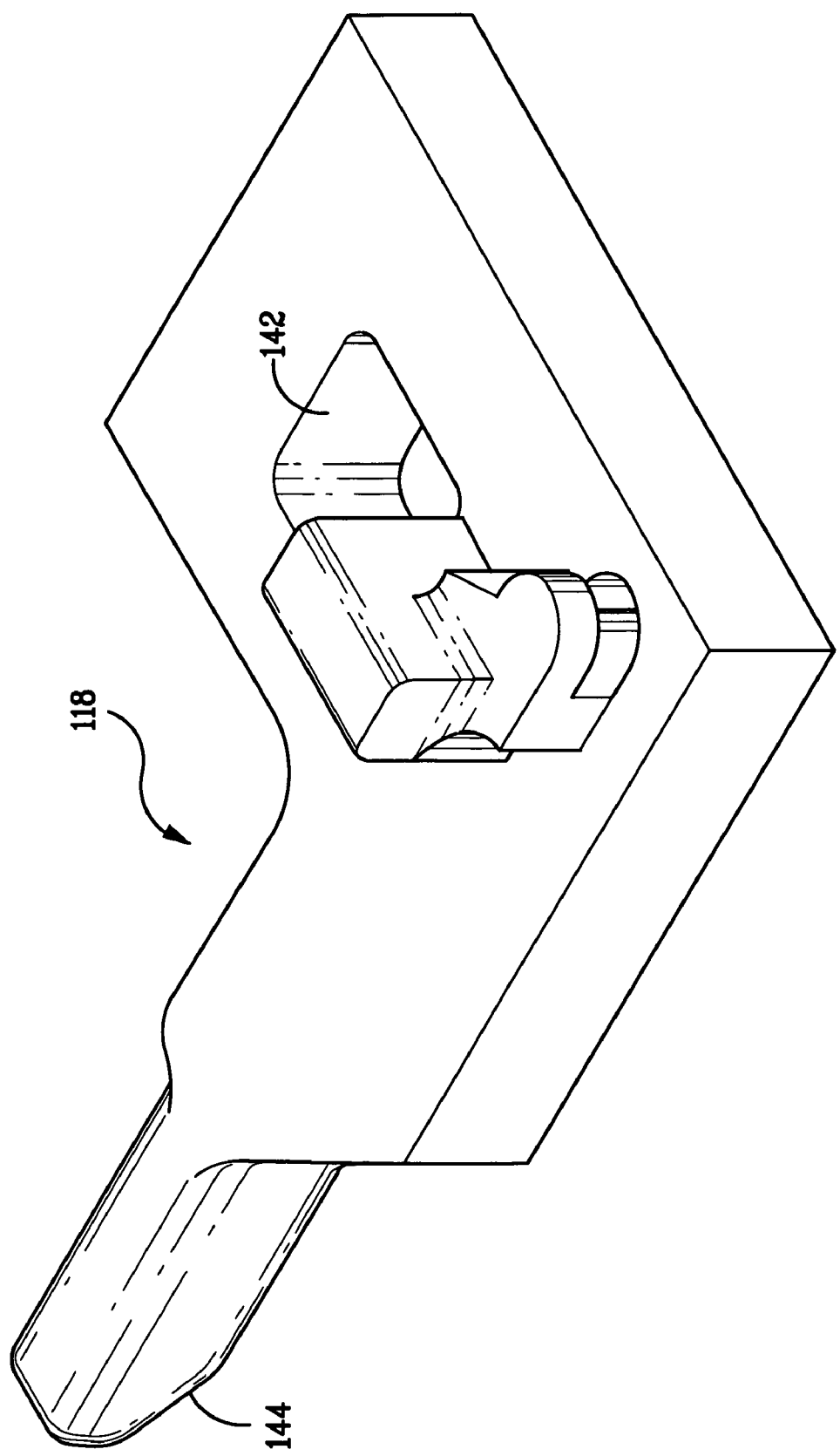
Figure 14:
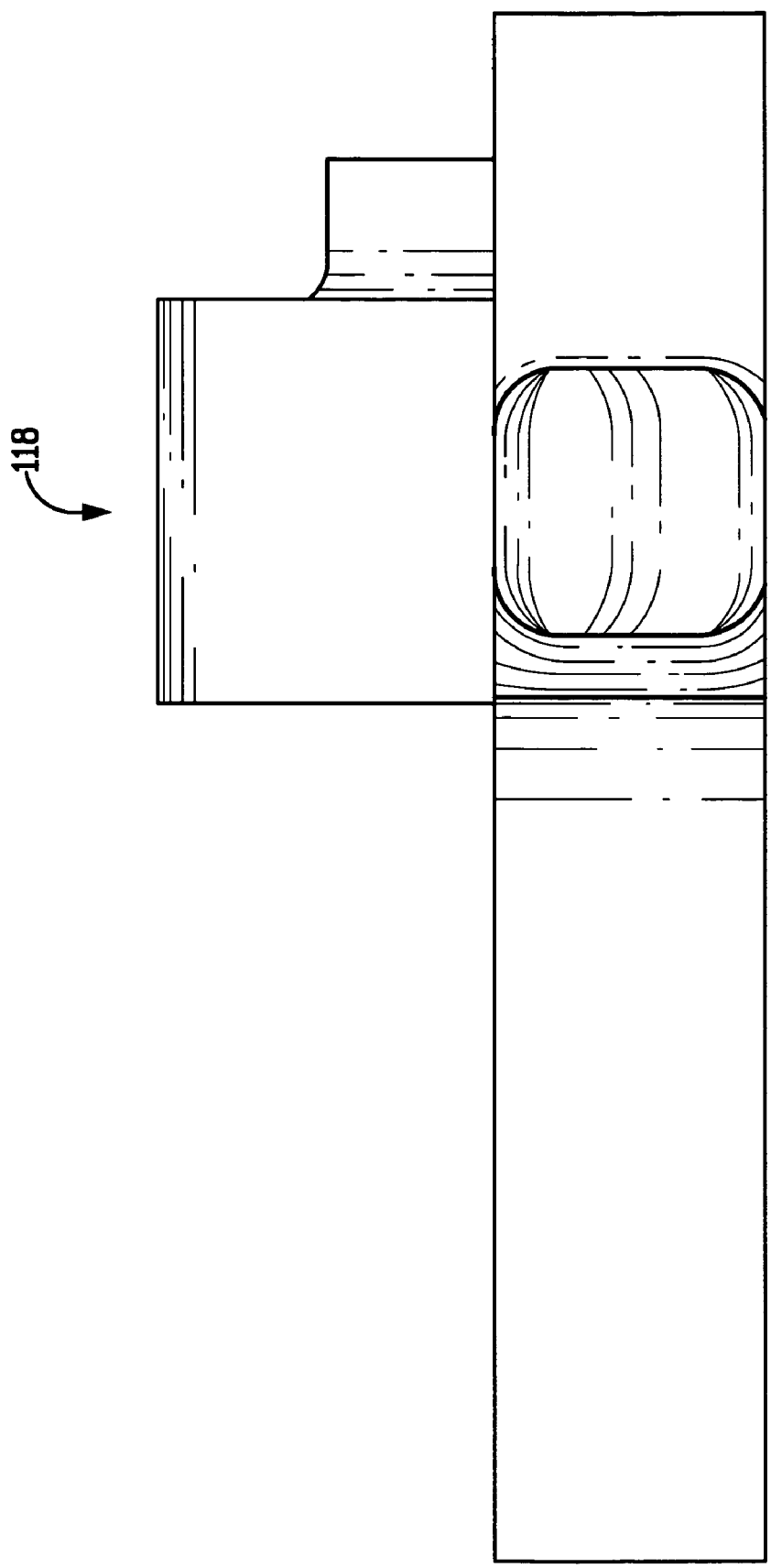
Figure 15:
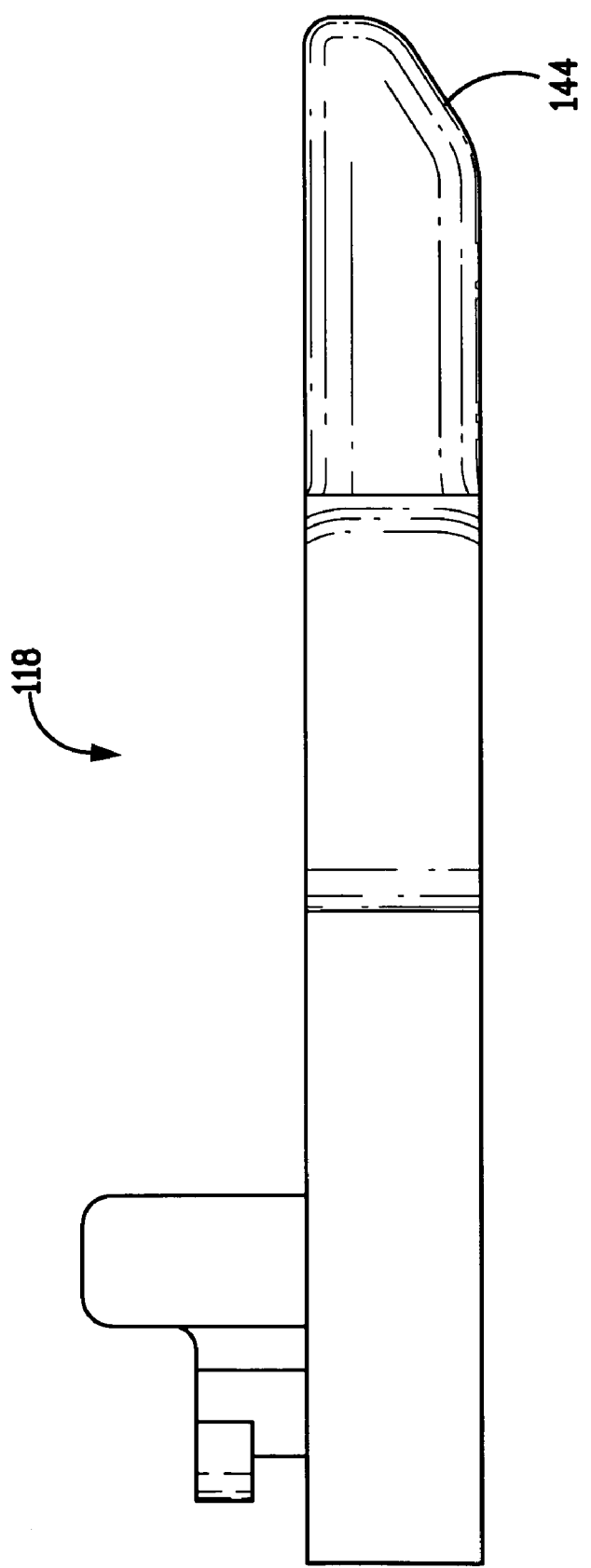
Figure 16:
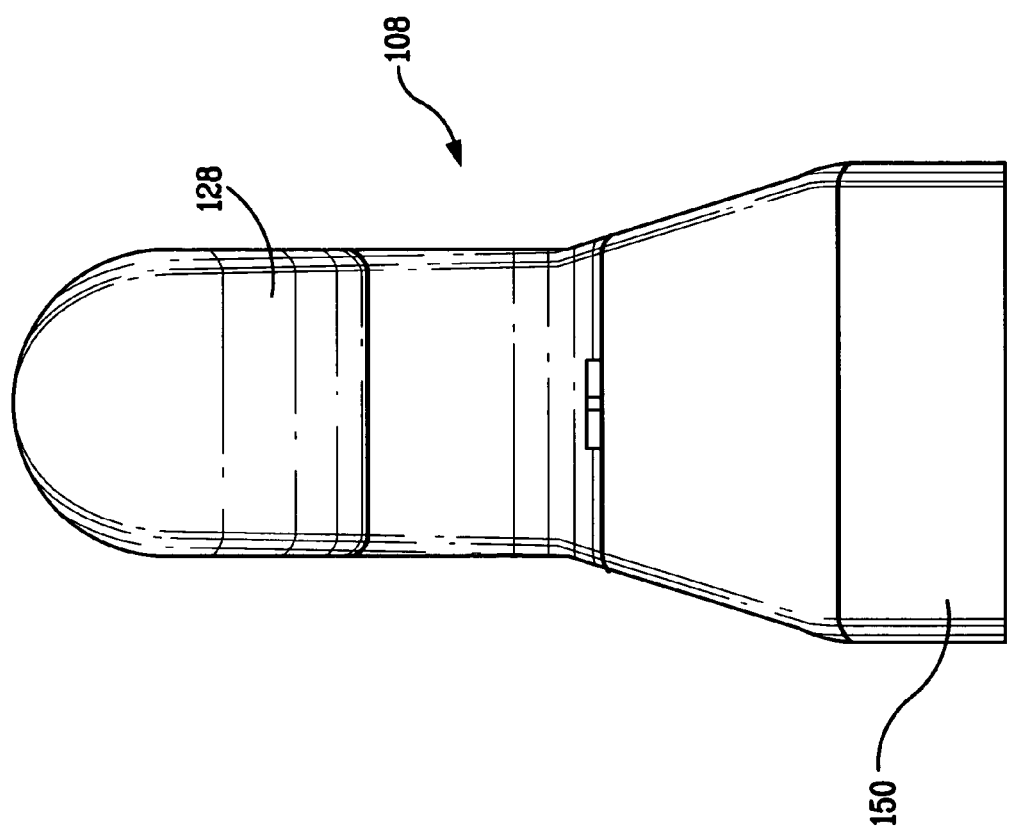
FIGS. 16–18 are views of the keeper of the present invention.
Figure 17:
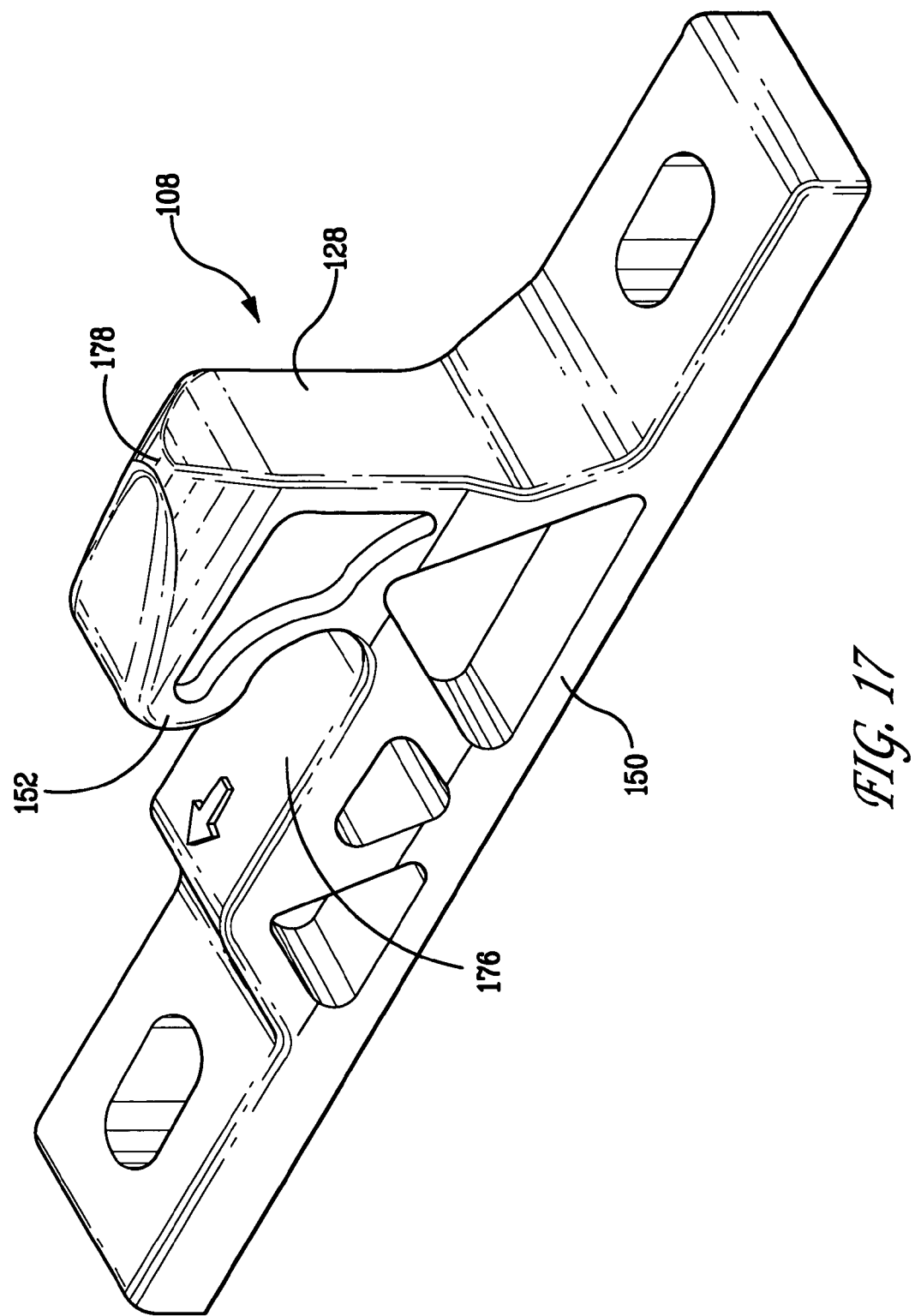
Figure 18:
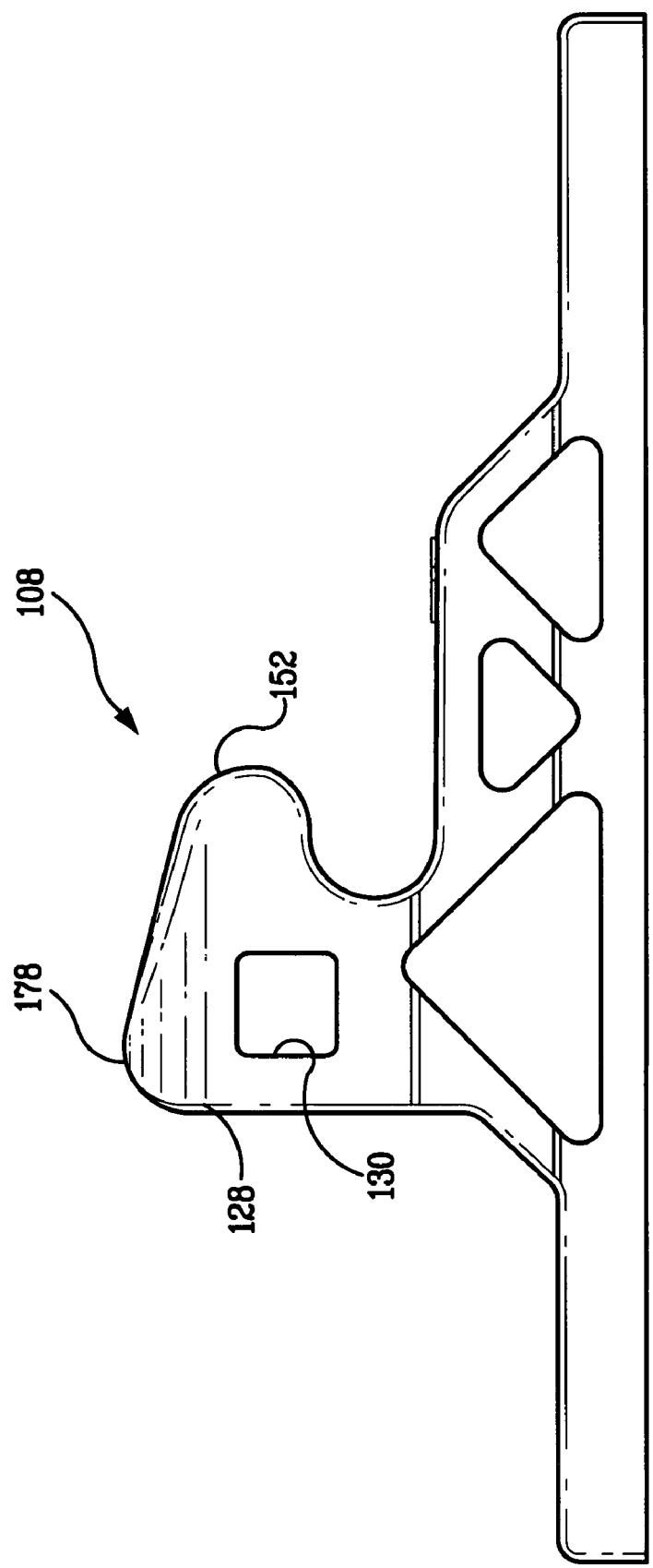
Figure 19:
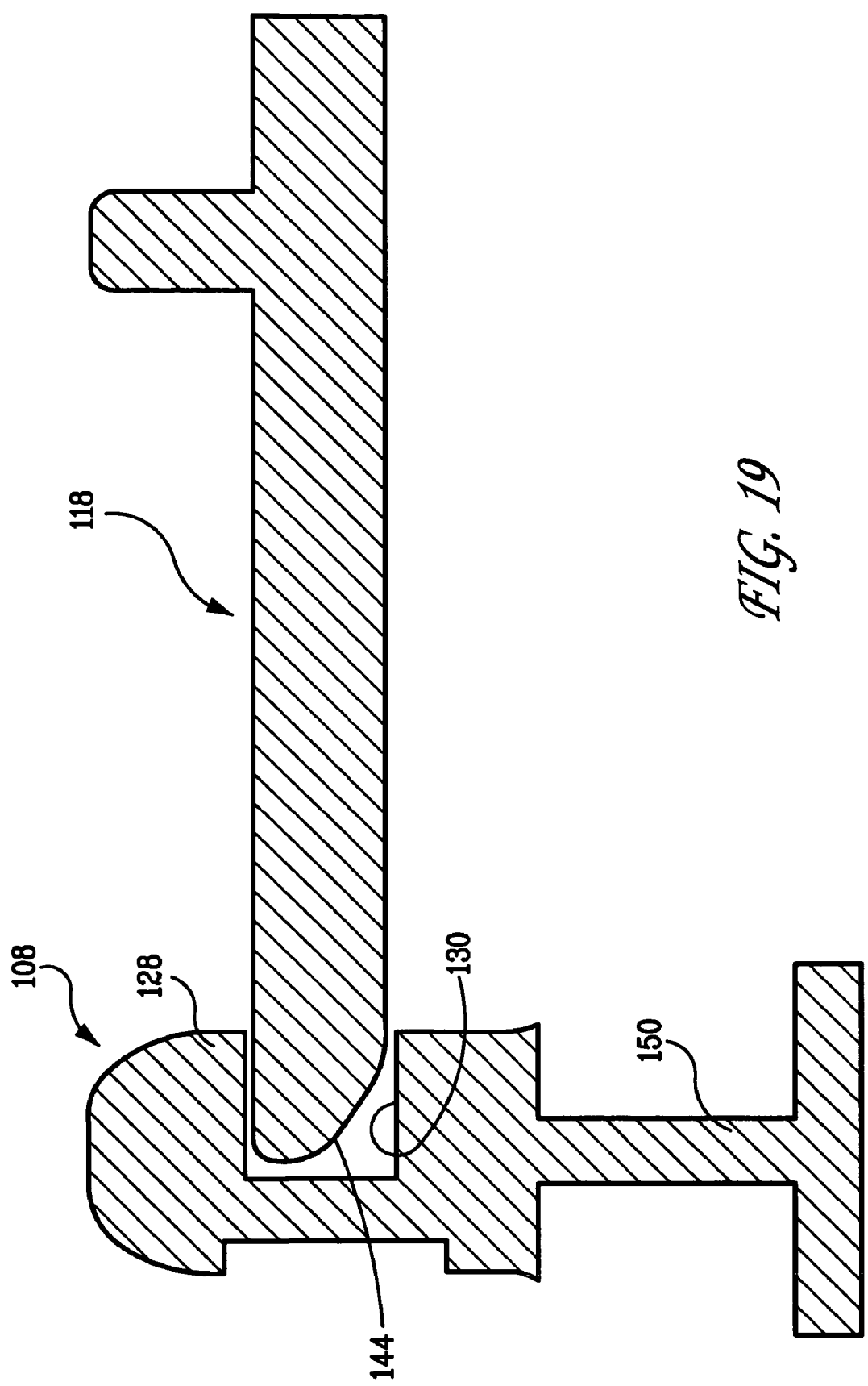
FIGS. 19–30 are fragmentary and environmental views illustrating the operation of the latching system of the present invention.
Figure 20:
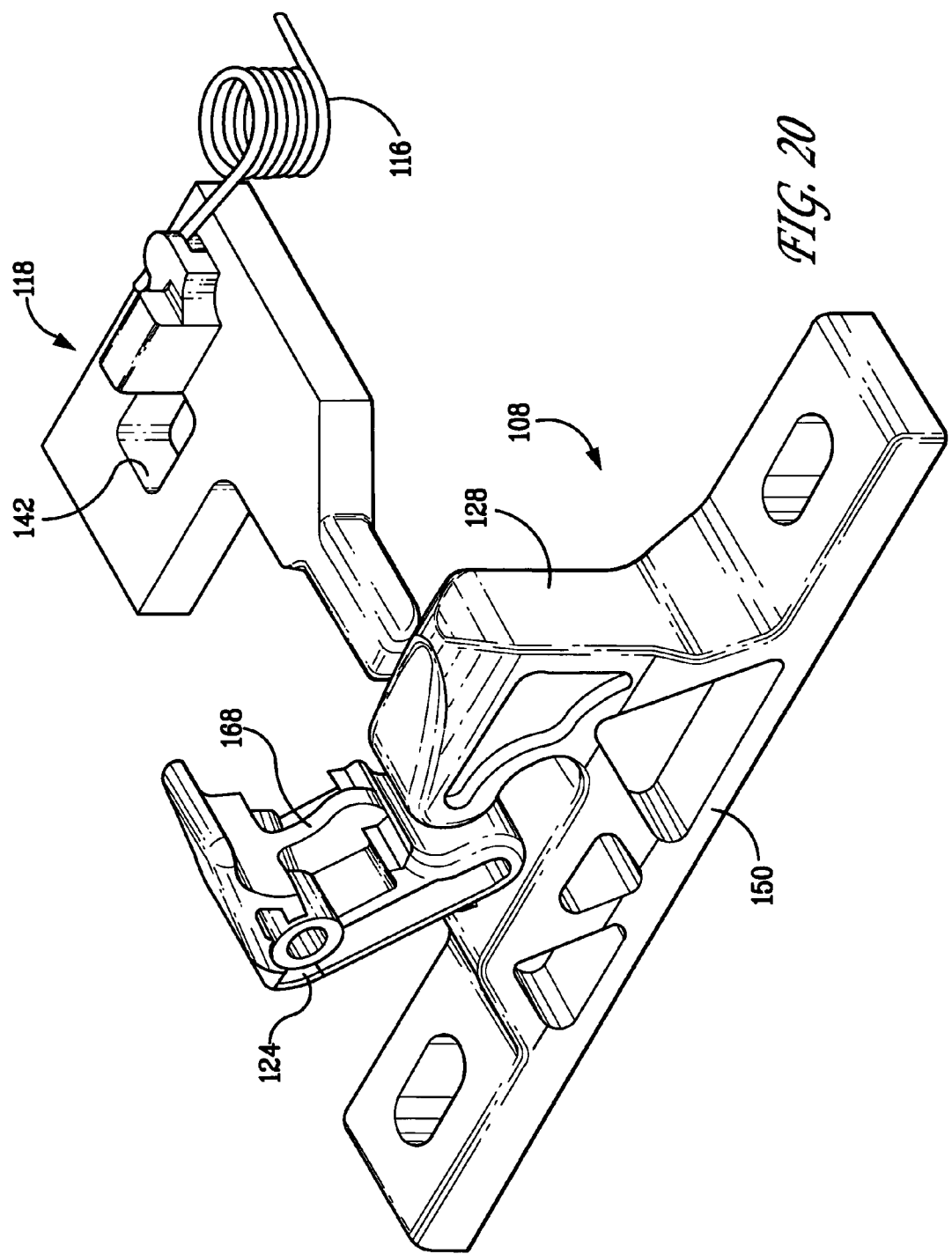
Figure 21:
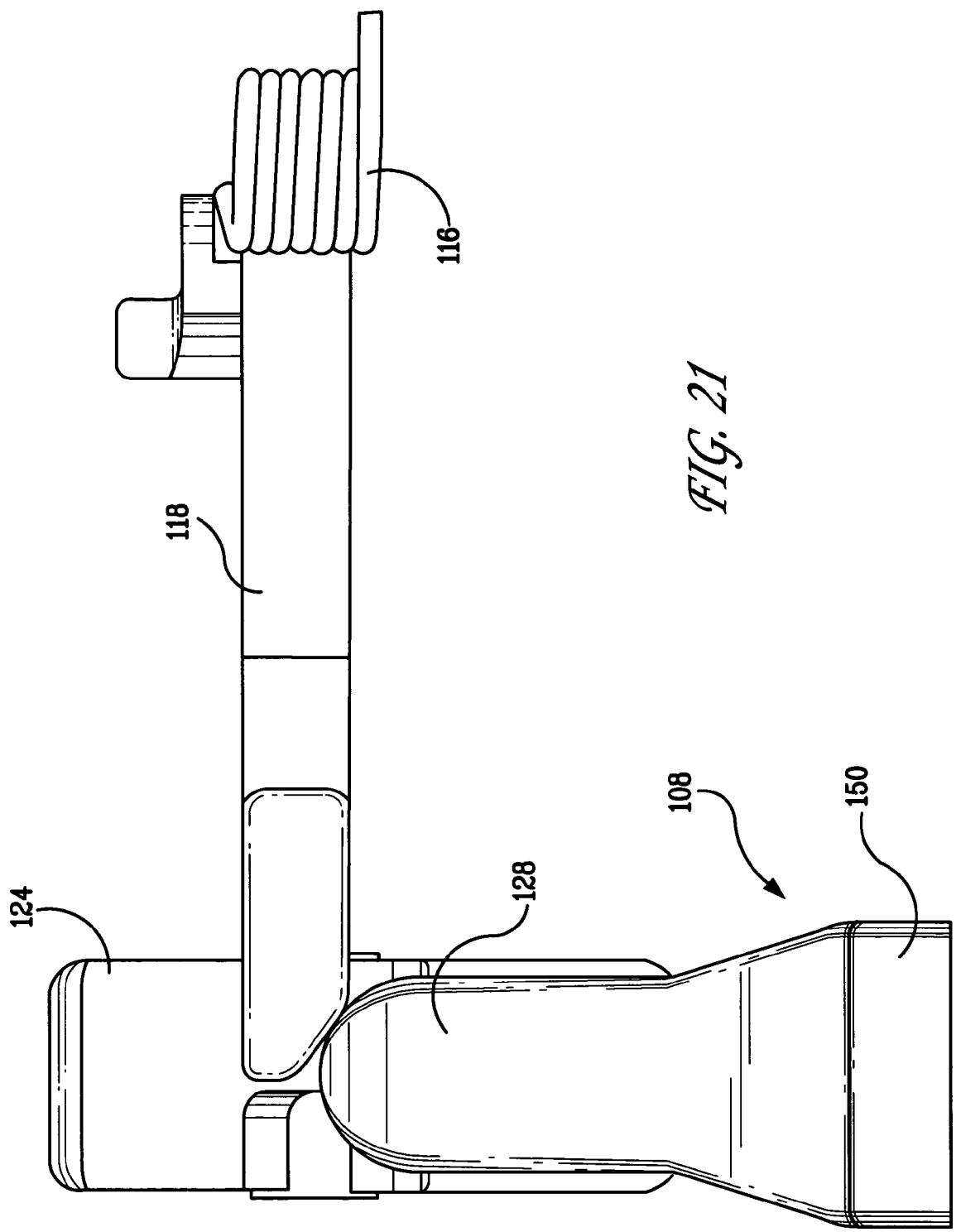
Figure 22:
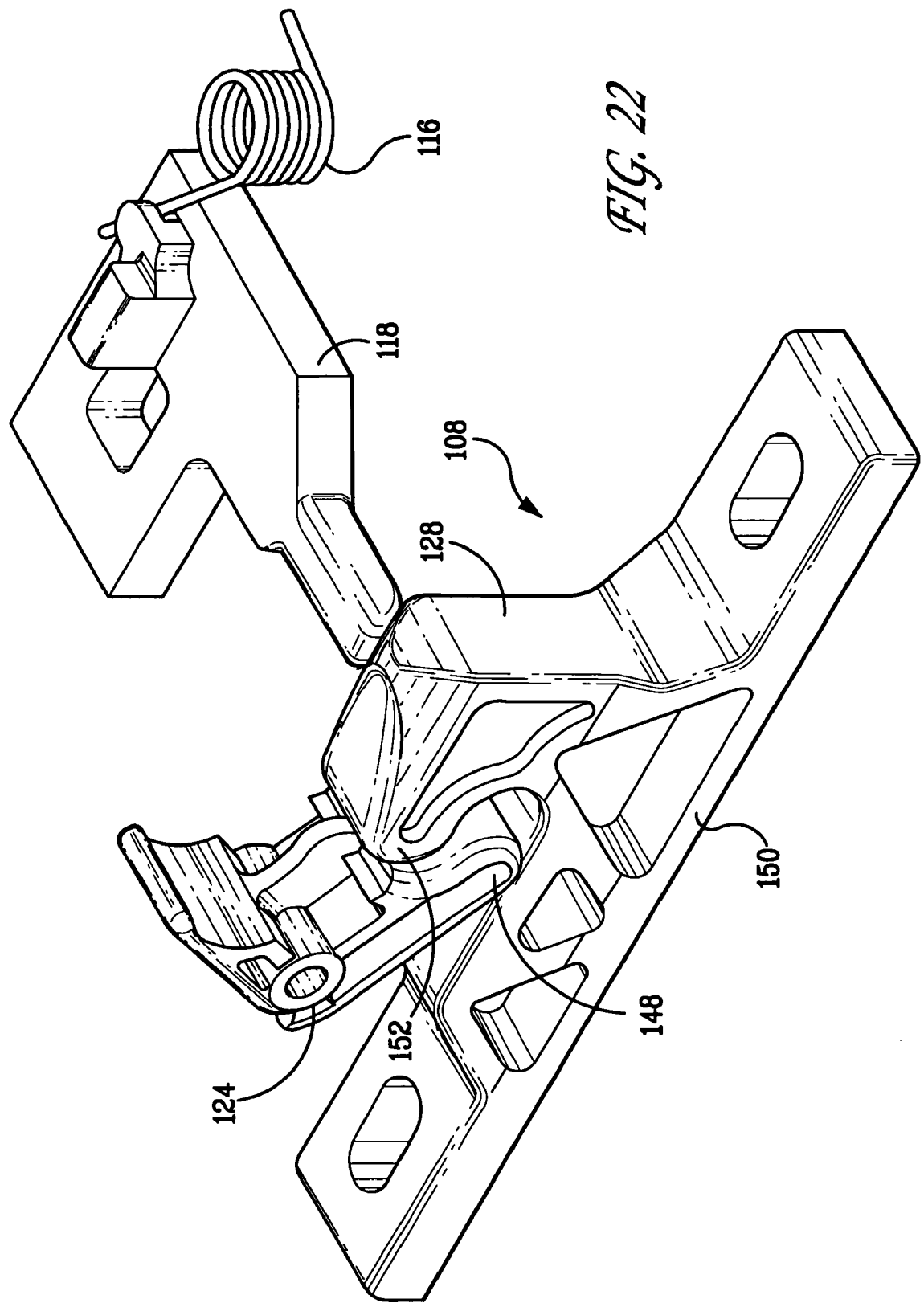
Figure 23:
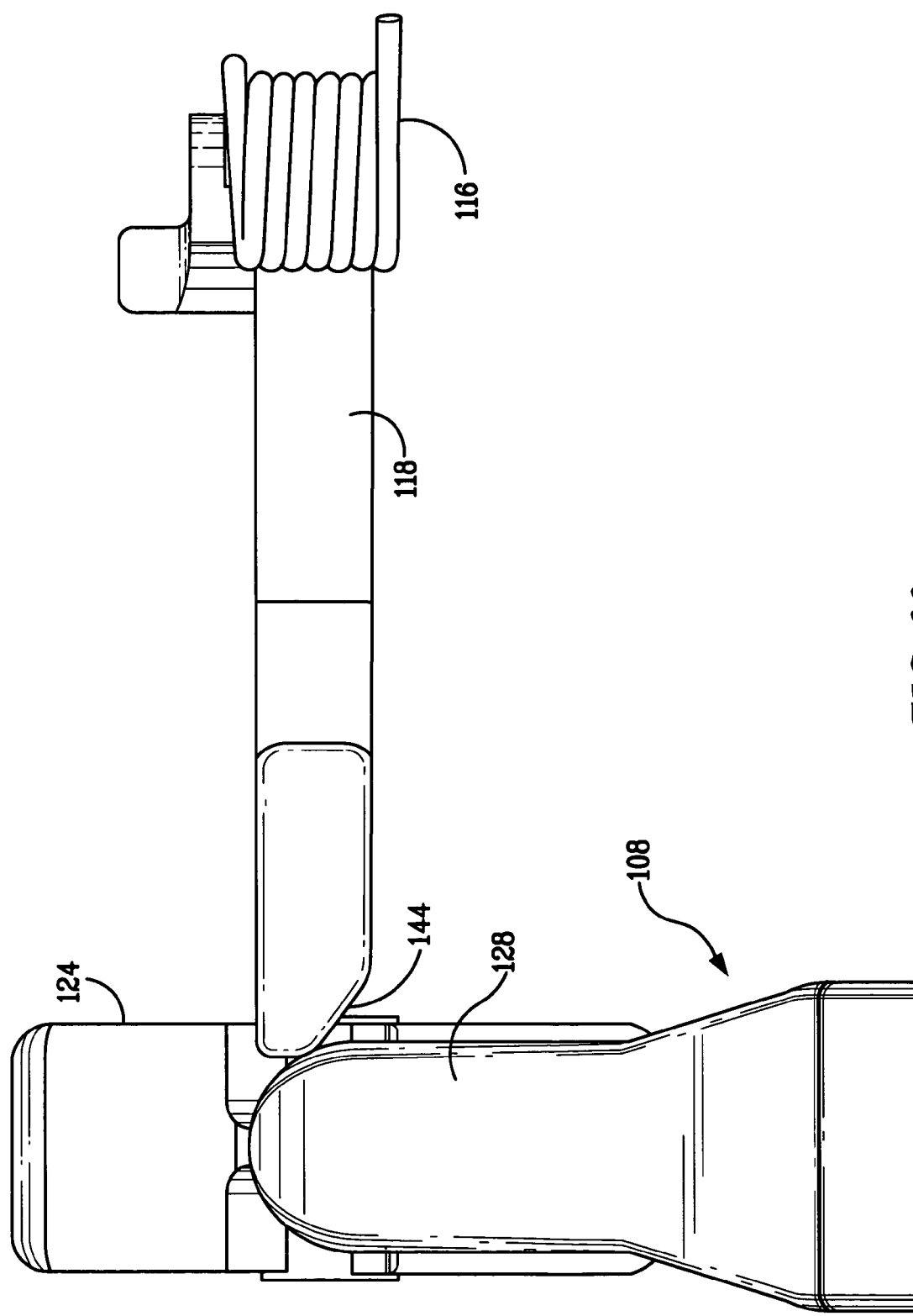
Figure 24:
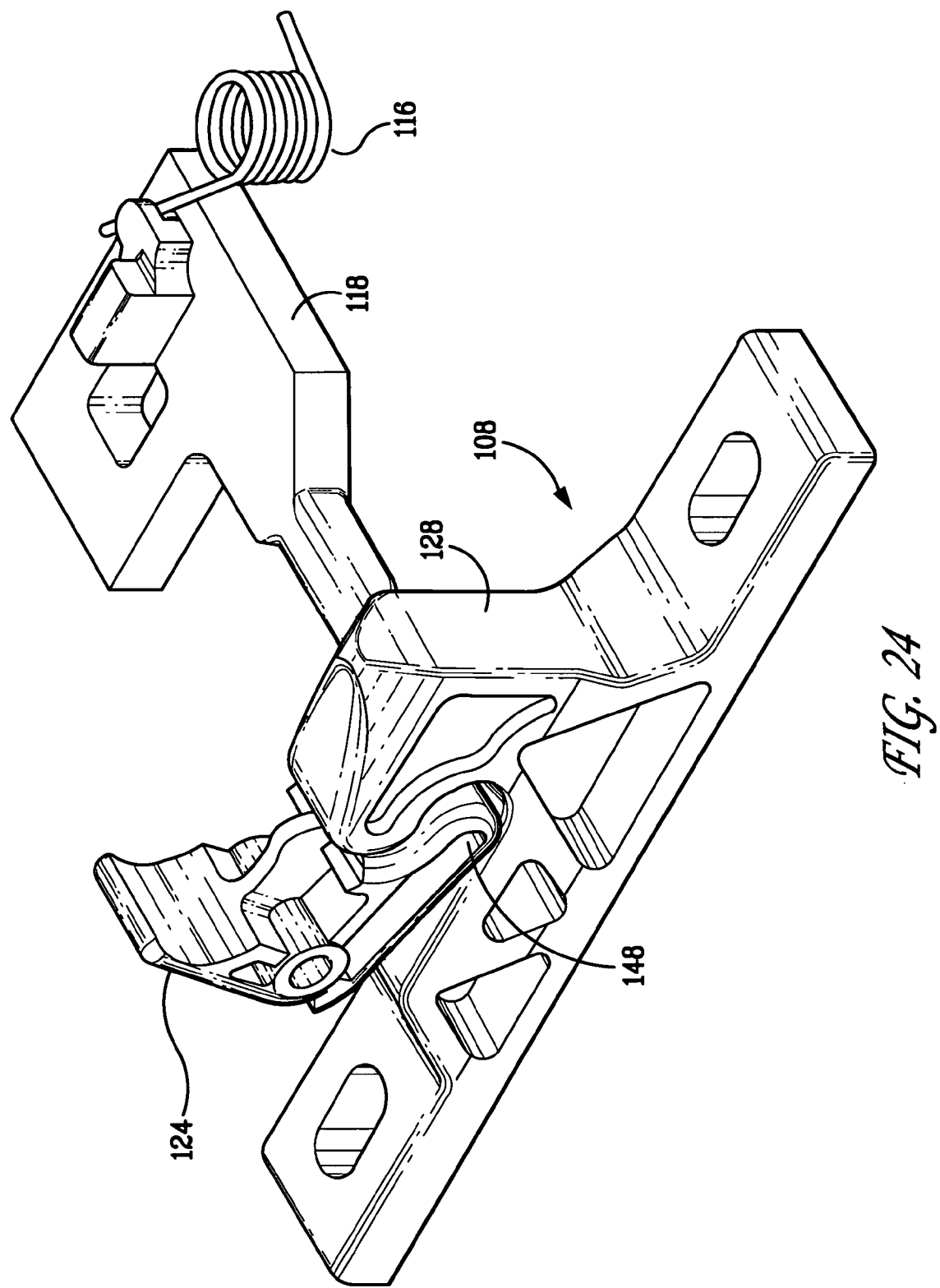
Figure 25:
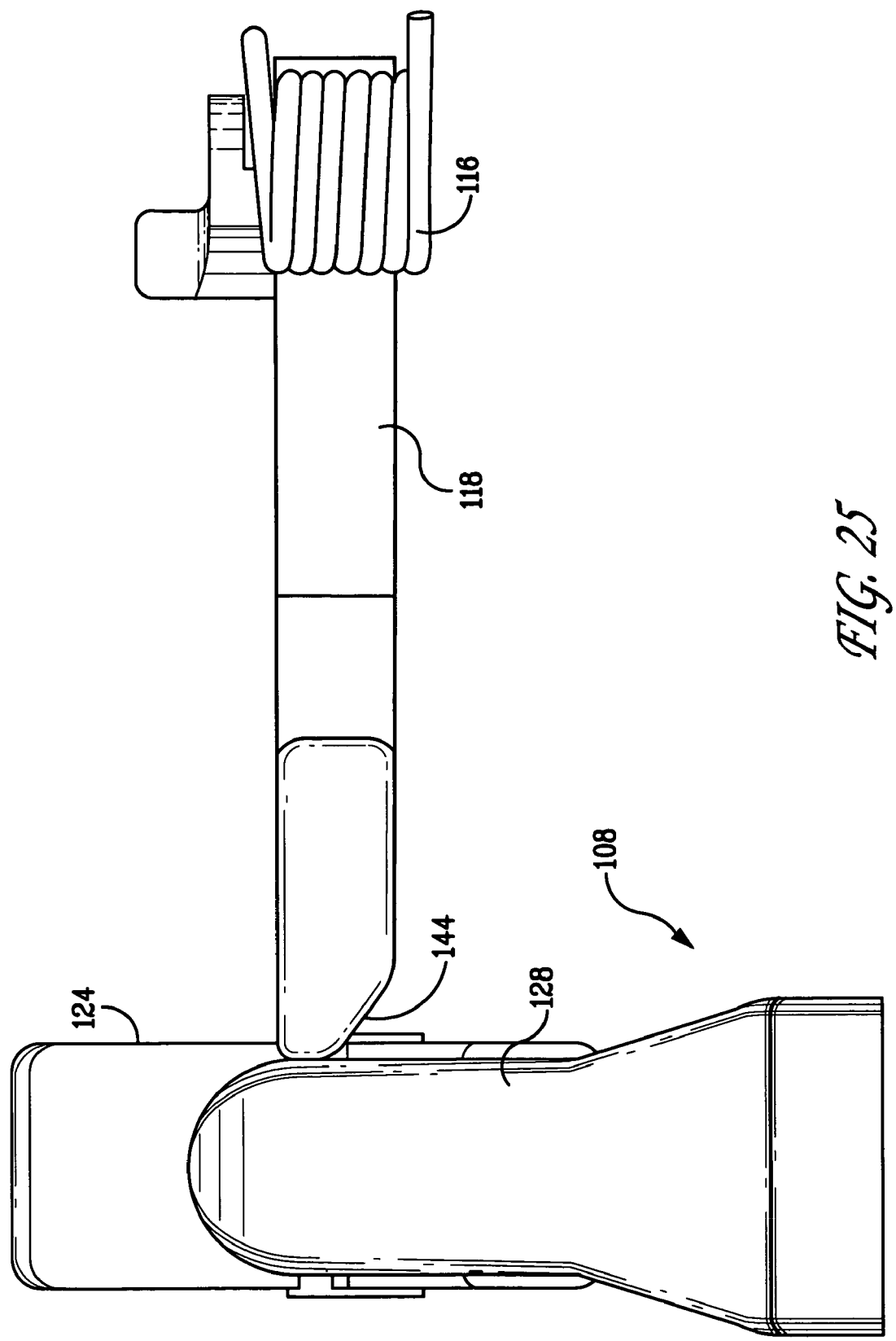
Figure 26:
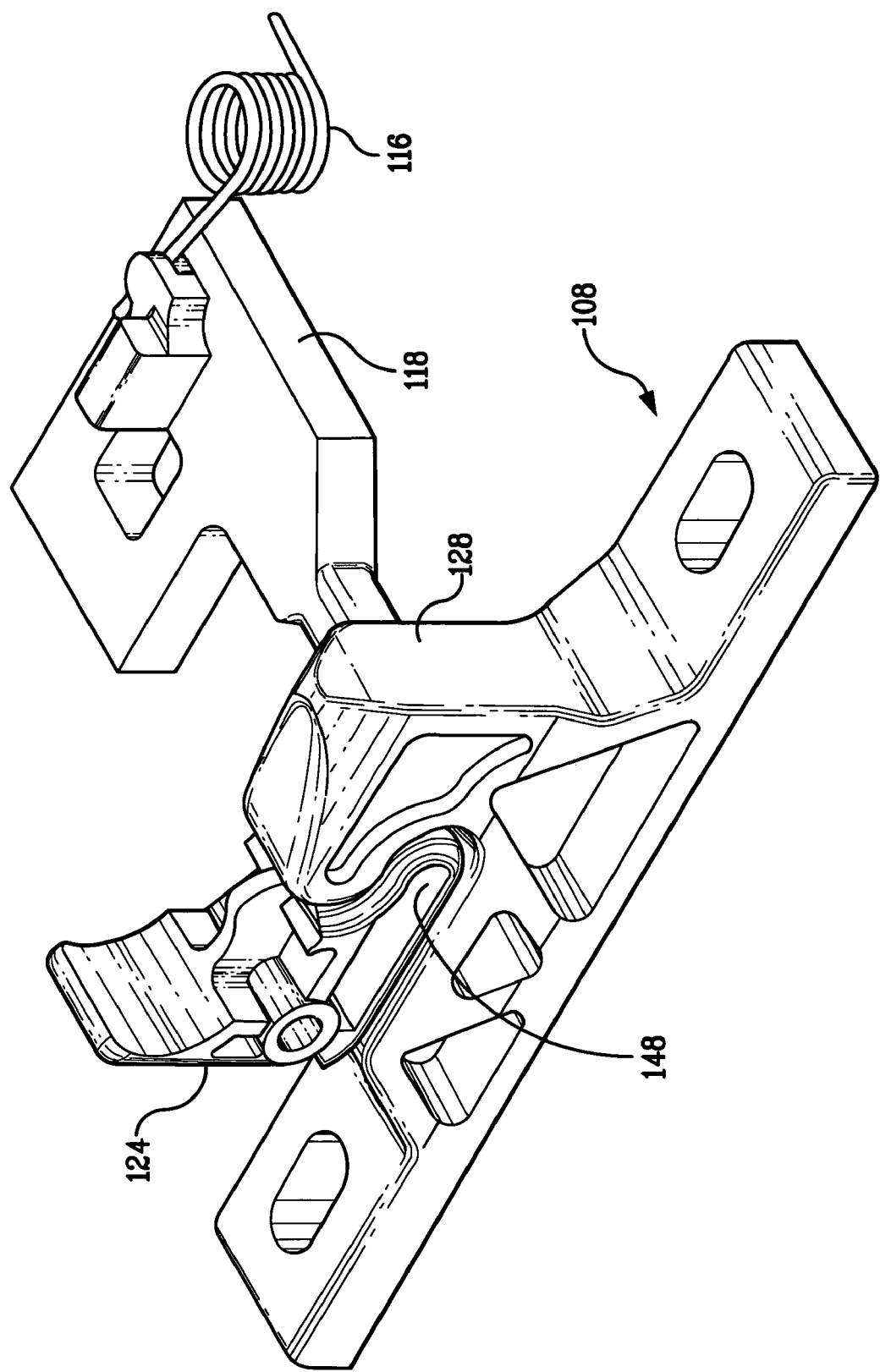
Figure 27:
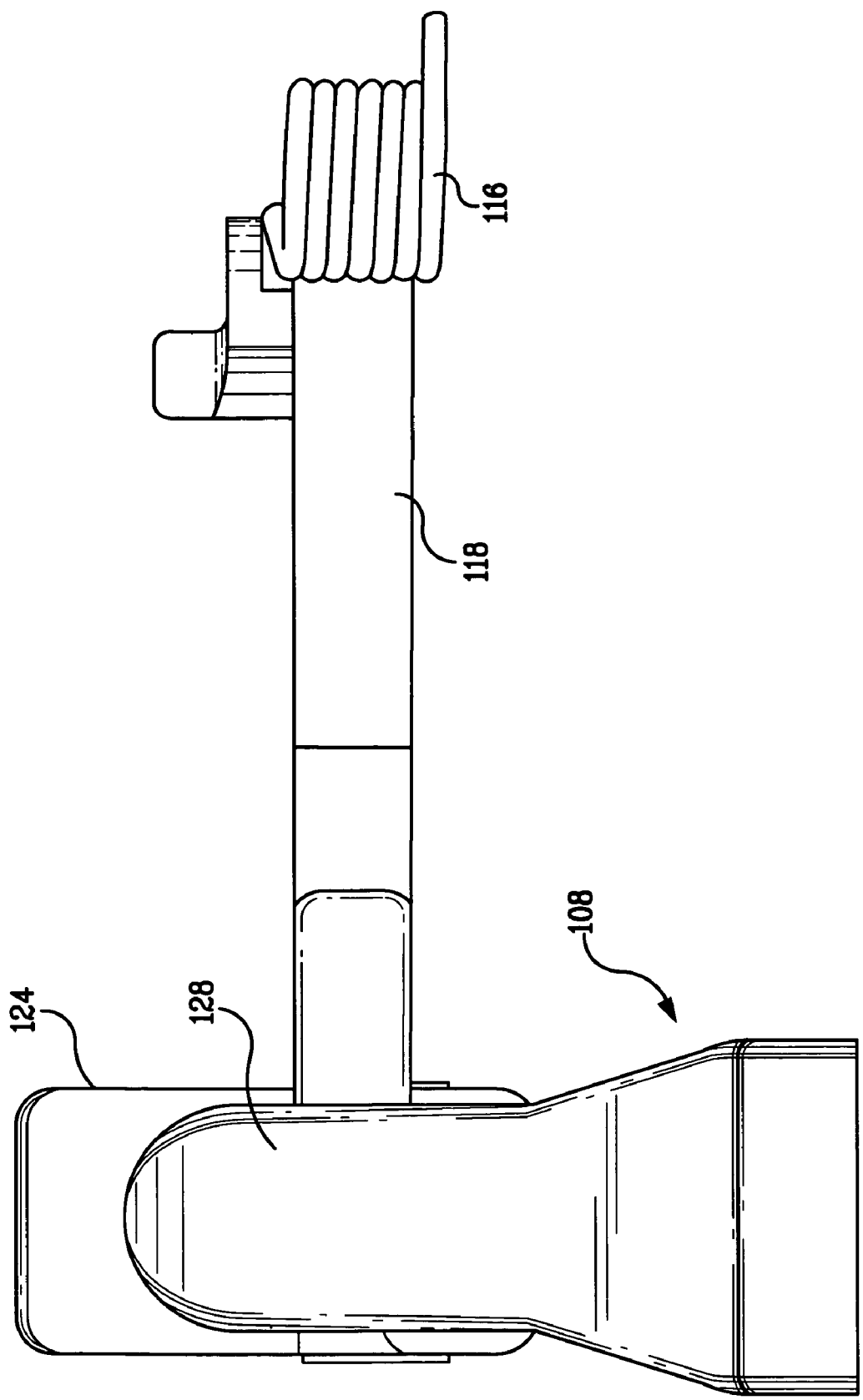
Figure 28:
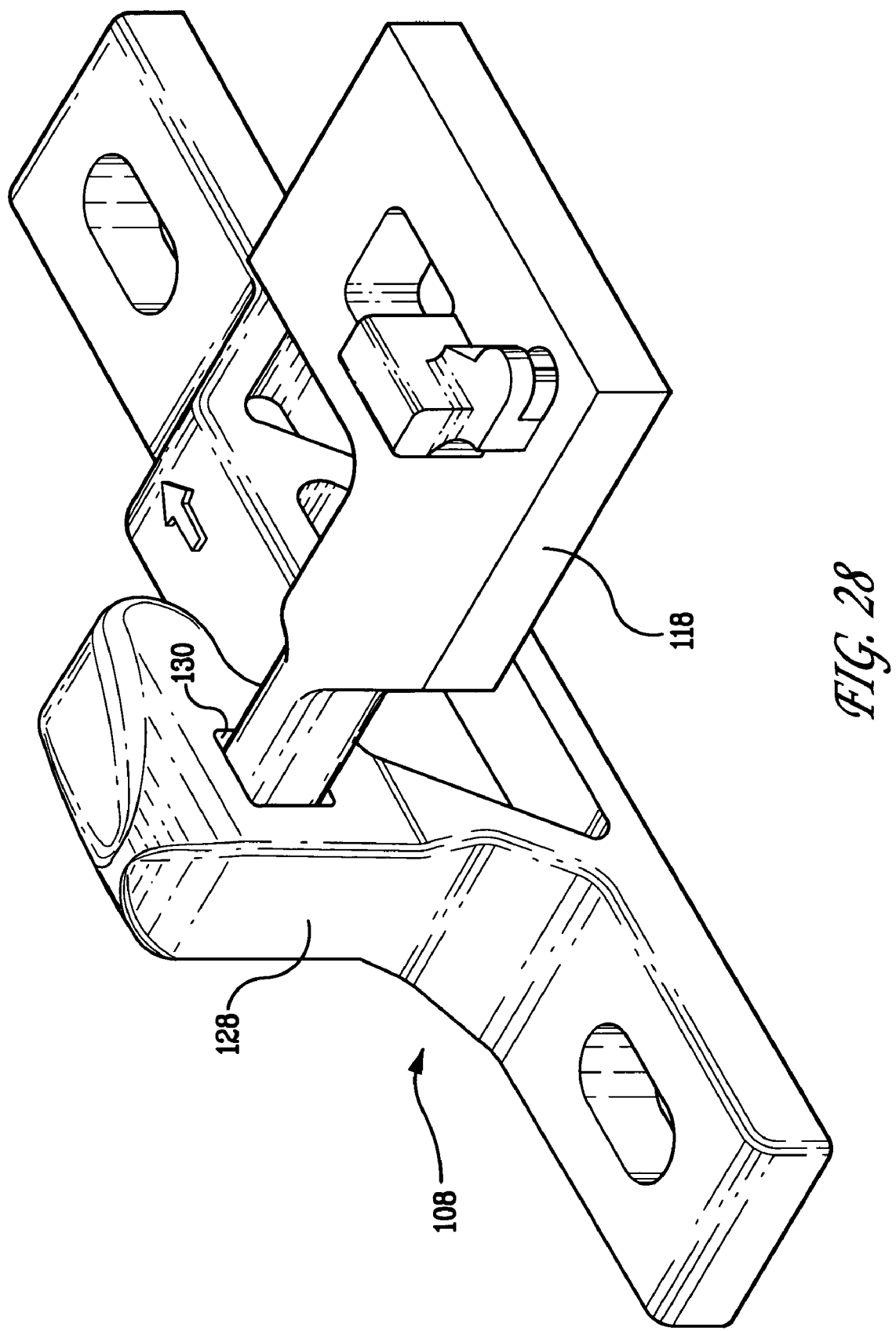
Figure 29:
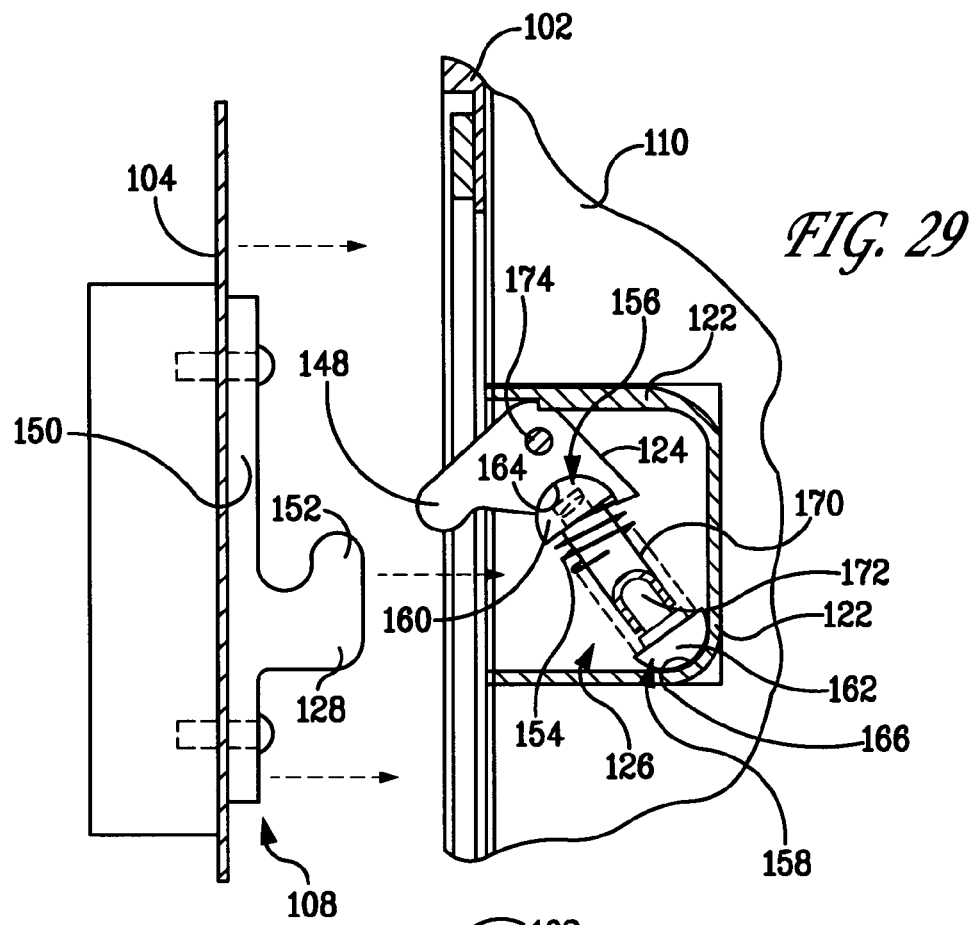
Figure 30:
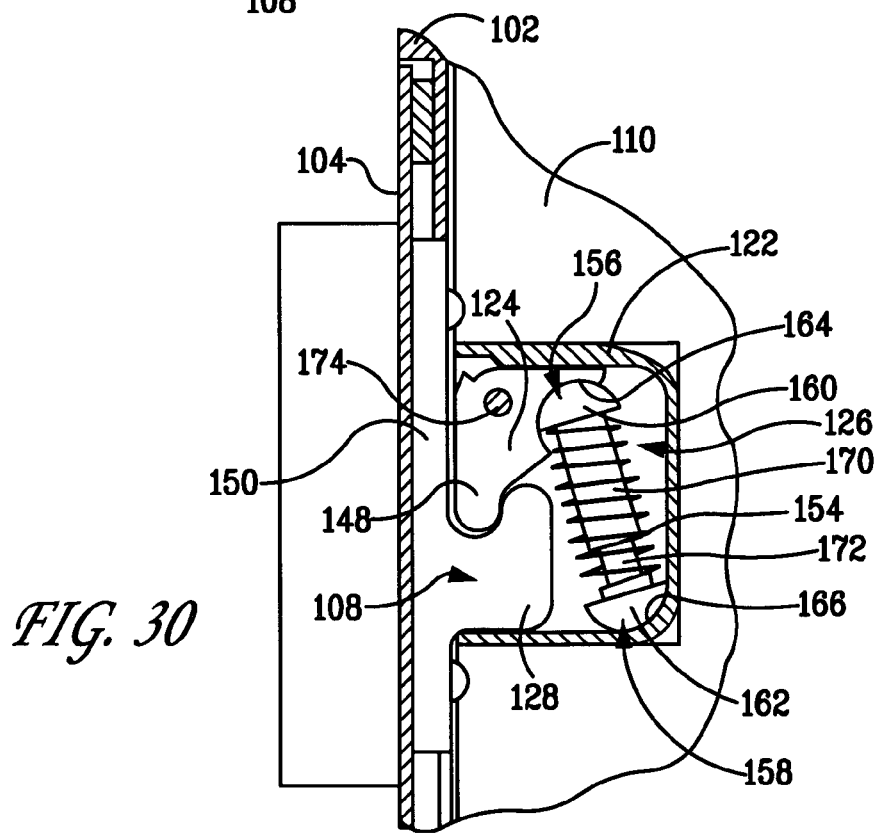

Referring to FIGS. 1–30, the present invention is directed to a latching system 100 for use with closure members such as panels, drawers, doors, etc. Although the operation of the latching system of the present invention will be described in the context of securing the load-floor panel 102 of the trunk of an automobile, the latch of the present invention is widely applicable to many kinds of doors, windows, panels, and drawers. The latching system of the present invention releasably secures a first closure member 102, such as a door, window, panel, or drawer, to a second closure member 104, such as another door, window, panel, or drawer or a frame surrounding the first closure member. The latching system 100 of the present invention includes a latch assembly 106 and a keeper 108. In its simplest form the latch assembly is formed by a cup-like housing incorporating a grabber catch adapted for engagement with the keeper 108. The illustrated embodiment of the latch assembly 106 includes a first housing 110, a handle 112, an actuator 114, a torsion spring 116, a first pawl 118 and a grabber catch 120. The grabber catch in turn includes a second housing 122, a second pawl 124, and a biasing means 126 that biases the second pawl 124 toward a latched position (shown in FIG. 30) when the second pawl 124 is at or near its latched position and biases the second pawl 124 toward an unlatched position (shown in FIG. 29) when the second pawl 124 is at or near its unlatched position. The second housing 122 is attached to the first housing 110. In the illustrated embodiment, the second housing 122 is integral with the first housing 110. The first pawl 118 travels rectilinearly between a retracted position (shown in FIGS. 6 and 25) and an extended position (shown in FIGS. 5, 19, 21, and 26–28), and the second pawl 124 moves pivotally. The second pawl 124 moves under an L-shaped projection 128 of the keeper 108 and the first pawl 118 moves into a cavity 130 in one side of the L-shaped projection 128, thus both the first and second pawl act to secure the latch assembly 106 to the keeper 108. The first housing 110 forms a cup-like depression which receives the handle 112 when the handle 112 is in the closed position illustrated in FIG. 1. The cup-like depression of the first housing 110 has an essentially enclosed bottom 132 and an open top 134. A bezel or flange 136 extends along at least a portion of the perimeter of the open top 134 of the first housing 110. The first housing 110 supports the torsion spring 116 and the first pawl 118. The handle 112 can be in the form of a paddle or a ring to facilitate grasping of the handle by a user.

The latch body 138 formed by the first housing 110 and the second housing 122 is installed in an aperture or cutout in the first closure member 102 using any of several well-known fastening means. The first pawl 118 projects through an opening 140 in the sidewall of the first housing 110 and into the second housing 122 at least when the first pawl 118 is in its extended position. The second housing 122 houses the second pawl 124 and the biasing means 126 for biasing the second pawl 124 toward a latched position (shown in FIGS. 26 and 30) when the second pawl 124 is at least approximately at its latched position and biasing the second pawl 124 toward an unlatched position (shown in FIGS. 4, 20, and 29) when the second pawl 124 is at least approximately at its unlatched position. The second pawl 124 and the biasing means 126 for biasing the second pawl 124 form what is referred to as an over-center toggle mechanism in the art. Examples of similar over-center toggle mechanisms can be found in U.S. Pat. No. 4,687,237, issued to Robert H. Bisbing on Aug. 18, 1987, and U.S. Pat. No. 6,203,077 B1, issued to Richard E. Schlack on Mar. 20, 2001, which are incorporated by reference herein in their entirety.

The torsion spring 116 biases the first pawl 118 toward its extended position where the first pawl 118 projects into the second housing 122. The handle 112 is pivotally supported by the first housing 110 and has an actuating arm 114 that impinges upon an opening 142 in the first pawl 118. The actuating arm 114 of the handle 112 constitutes the actuator in the illustrated embodiment. When the latch handle 112 is lifted out of the cup-like depression of the first housing 110, the actuating arm 114 of the handle 112 retracts the first pawl 118 to the unlatched position. Once the first pawl 118 is in the unlatched position, the handle 112 must be pulled with sufficient force to overcome the force exerted by the biasing means 126 of the grabber catch 120 on the second pawl 124 in order to move the first closure member 102 to the open position.

During closing of the first member 102, a beveled surface 144, provided on the underside of the first pawl 118, cooperates with the roughly L-shaped projection 128 of the keeper 108 to slide the pawl 118 to the unlatched position as the first closure member 102 is slammed shut. The torsion spring 116 then moves the first pawl 118 to the latched position once the first pawl 118 is in alignment with the cavity or hole 130 in the side of the L-shaped projection 128 such that the pawl 118 will extend into the cavity or hole 130 in the side of the L-shaped projection 128 in order to secure the first closure member 102 in place.

At the beginning of the closing sequence just described, the second pawl 124 is in the unlatched position and is held there by the biasing force of the biasing means 126 of the grabber catch. In this position the biasing force of the biasing means 126 of the grabber catch biases the second pawl 124 toward the unlatched position. The second housing 122 has an open bottom 146 that faces in the direction opposite the direction in which the open top 134 of the first housing 110 faces. As the first closure member 102 is moved to the closed position, the L-shaped projection 128 begins to move into the second housing 122 through the open bottom 146 of the second housing. With the second pawl 124 in the unlatched position, the L-shaped projection 128 of the keeper 108 clears the second pawl 124. As the L-shaped projection 128 and the second housing 122 relatively move such that more of the L-shaped projection 128 projects into the second housing 122, a point is reached where a projecting arm 148 of the second pawl 124 contacts the base 150 of the keeper 108 and begins to pivotally move toward the latched position. During movement of the second pawl 124 toward the latched position, the projecting arm 148 of the second pawl 124 moves under the portion 152 of the L-shaped projection 128 that overhangs the base 150 of the keeper 108 in cantilever fashion. Furthermore, during movement of the second pawl 124 toward the latched position, the second pawl 124 passes through a neutral position intermediate the unlatched position and the latched position. Once the second pawl 124 is intermediate the neutral position and the latched position, the biasing tendency of the biasing means 126 of the grabber catch changes such that the biasing means 126 of the grabber catch now biases the second pawl 124 toward the latched position. Thus, when the second pawl 124 is intermediate the neutral position and the latched position the biasing force of the biasing means 126 of the grabber catch, acting via the second pawl 124, tends to pull the L-shaped projection 128 of the keeper into the second housing 122. In this way, the potential energy stored in the biasing means 126 of the grabber catch when the second pawl 124 is in the neutral position aids in the closing of the first closure member 102 to thereby reduce the effort required for closing the first closure member.

With the second pawl 124 in the latched position, the first closure member 102 is secured in the closed position by the biasing force of the biasing means 126 of the grabber catch. In addition, the first pawl 118 simultaneously moves into the cavity 130 in the side of the L-shaped projection 128 of the keeper to positively secure the latch assembly 106 to the keeper 108 such that the first closure member 102 cannot be opened with out operating the handle 112 of the latch assembly.

To open the first closure member 102, the latch handle 112 is lifted out of the cup-like depression of the first housing 110 causing the actuating arm 114 of the handle to retract the first pawl 118 to the unlatched position. Once the first pawl 118 is in the unlatched position, the handle 112 must be pulled with sufficient force to overcome the force exerted by the biasing means 126 of the grabber catch on the second pawl 124 in order to move the first closure member to the open position. During this phase of the opening operation the second pawl 124 is moved from the latched position toward the unlatched position by the pulling force exerted on the second pawl 124 by the L-shaped projection 128 of the keeper. During movement of the second pawl 124 toward the unlatched position, the second pawl 124 passes through the same neutral position intermediate the latched position and the unlatched position. Once the second pawl 124 is intermediate the neutral position and the unlatched position, once again the biasing tendency of the biasing means 126 of the grabber catch changes such that the biasing means of the grabber catch now biases the second pawl toward the unlatched position. Once the second pawl 124 is in the unlatched position, the L-shaped projection 128 of the keeper clears the second pawl 124 such that the L-shaped projection 128 of the keeper can be removed from the second housing 122 and the keeper 108 can be released from the latch assembly 106.

The biasing means 126 biases the second pawl 124 toward a latched position when the second pawl is at least approximately at its latched position and biases the second pawl 124 toward an unlatched position when the second pawl is at least approximately at its unlatched position. By this it is meant that when the second pawl 124 is at least at or near the latched position the biasing means 126 of the grabber catch biases the second pawl 124 toward the latched position, and when the second pawl 124 is at least at or near the unlatched position the biasing means 126 of the grabber catch biases the second pawl 124 toward the unlatched position. In the illustrated embodiment, the biasing means 126 of the grabber catch includes a compression or coil spring 154 and two guide members 156 and 158. Each guide member 156, 158 has an end member 160, 162 in the form of half of a right circular cylinder formed by cutting the cylinder long the longitudinal axis thereof. The arcuate surface 164 of one end member forms a bearing surface that seats against a complimentary bearing surface 168 in the second pawl 124. The arcuate surface 166 of the other end member forms a bearing surface that seats against a complimentary bearing surface in a corner of the second housing 122. The coil spring 154 is captured between the flat surfaces of the end members 160, 162. One end member 160 has a sleeve 170 that receives a rod 172 projecting from the other end member 162 in a telescoping fashion. The telescoping rod and sleeve guide the movements of the end members 160, 162 toward or away from each other while keeping the coil spring 154 positioned intermediate the end members such that the coil spring contracts and expands as the end members move toward or away from each other.

The second pawl 124 is pivotally supported relative to the second housing 122 by a pin 174 the longitudinal axis of which defines the axis of rotation of the second pawl. When the second pawl 124 is in the neutral position, the line of force coincident with the force exerted by the biasing means 126 of the grabber catch intersects the rotational axis of the second pawl 124 and thus exerts no torque on the second pawl. The coil spring 154 is most compressed when the second pawl 124 is in the neutral position. The biasing means 126 of the grabber catch biases the second pawl 124 toward the latched position when the second pawl is in one of the latched position and a position intermediate the neutral position and the latched position. The biasing means 126 of the grabber catch biases the second pawl 124 toward the unlatched position when the second pawl is in one of the unlatched position and a position intermediate the neutral position and the unlatched position. In the illustrated embodiment, the angular range of the pivotal movement of the second pawl 124 as it moves between the neutral position and the latched position is significantly larger than the angular range of the pivotal movement of the second pawl 124 as it moves between the neutral position and the unlatched position.

The keeper 108 has a projection 128 that has been previously described as L-shaped. This description is meant to only roughly describe the projection of the Keeper. The projection 128 of the keeper 108 projects from the base of the keeper and has a portion 152 that overhangs the base 150 of the keeper in cantilever fashion. As such the projection 128 can be thought of as having an upside down L-shape or being hook-like. In general, this type of projection is referred to in the art as a projecting dog. In some of the illustrated embodiments, the base of the keeper forms a raised platform 176 in the region contacted by the second pawl 124 and in the region under the overhanging portion of the projecting dog 128. This arrangement is used to accommodate varying panel thicknesses while keeping the height of the overhanging portion 152 above the surface of the base contacted by the second pawl 124 constant, because that height is dictated by depth of the second housing 122 and the thickness of the projecting arm 148 of the second pawl. Furthermore, the top end of the projecting dog 128 is tapered on all sides to form a peak 178 in order to facilitate entry of the projecting dog 128 into the second housing 122 and the moving of the first pawl 118 toward the retracted position and out of the way of the projection dog as the projecting dog enters into the second housing 122 during closing of the first closure member.

The illustrated embodiment is susceptible to many modifications without departing from the scope and spirit of the appended claims. Although in the preferred embodiment a rectilinearly moving pawl is used, the latching system could be made without it. In this case the pivoting handle 112 would not be necessary and the first housing itself can act as a pull handle. In such a case the first housing can be provided with, for example, a plate that partially overhangs its open top 134 and eliminating the upward projecting wall 180 to thereby afford the user a grip.

It is to be understood that the present invention is not limited to the embodiments described above, but encompasses any and all embodiments within the scope of the following claims.

The invention claimed is:

1. A latching system for releasably securing a first closure member in a closed position relative to a second closure member, the latching system comprising:

a keeper adapted for attachment to the second closure member, the keeper having a base and a dog projecting from said base, wherein said projecting dog has a cavity;

a latch assembly comprising:

a cup-like first housing adapted for being mounted to the first closure member and being adapted to transmit a pulling force exerted by a user to the first closure member;

a handle pivotally attached to said first housing, said handle having an actuating arm;

a first pawl supported for rectilinear movement between a retracted and an extended position, said first pawl being engageable by said actuating arm, said first pawl being movable from said extended position to said retracted position responsive to pivotal movement of said handle; said first pawl being engageable with said cavity to prevent disengagement of said keeper from said latch assembly without pivotal movement of said handle; and a grabber catch attached to said first housing and being releasably engageable to said projecting dog, said grabber catch comprising a pivotally movable second pawl that is pivotally movable between a latched position and an unlatched position, said second pawl passing through a neutral position intermediate said latched position and said unlatched position as said second pawl moves between said latched position and said unlatched position, and biasing means biasing said second pawl toward said latched position when said second pawl is in one of said latched position and a position intermediate said neutral position and said latched position, said biasing means biasing said second pawl toward said unlatched position when said second pawl is in one of said unlatched position and a position intermediate said neutral position and said unlatched position.

2. The latching system of claim 1, wherein said first pawl is biased toward said extended position.

3. The latching system of claim 2, wherein said first pawl has a beveled surface that can be acted upon by said by said dog to move said first pawl toward said retracted position during movement of the first closure member to the closed position.

4. The latching system according to any one of claims 1–3, wherein said dog is approximately in the form of an L-shaped projection having a portion that overhangs said base of said keeper in cantilever fashion.

5. The latching system according to any one of claims 1–3, wherein said grabber catch further comprises a second housing attached to said first housing, said second pawl being positioned at least in part within said second housing.

* * * * *